US011270507B1

(12) United States Patent
Lambert et al.

(10) Patent No.: US 11,270,507 B1
(45) Date of Patent: Mar. 8, 2022

(54) RENDERING TEXTURES UTILIZING SHARP DISPLACEMENT MAPPING

(71) Applicants: Adobe Inc., San José, CA (US); Institut Mines Telecom, Palaiseau (FR)

(72) Inventors: Thibaud Lambert, Paris (FR); Tamy Boubekeur, Paris (FR); Anthony Salvi, Paris (FR)

(73) Assignees: Adobe Inc., San Jose, CA (US); Institut Mines Telecom, Palaiseau (FR)

( * ) Notice: Subject to any disclaimer, the term of this patent is extended or adjusted under 35 U.S.C. 154(b) by 0 days.

(21) Appl. No.: 16/953,805

(22) Filed: Nov. 20, 2020

(51) Int. Cl.
 *G06T 17/20* (2006.01)
 *G06T 3/40* (2006.01)
 *G06T 5/00* (2006.01)
 *G06T 11/00* (2006.01)

(52) U.S. Cl.
 CPC ............ *G06T 17/20* (2013.01); *G06T 3/4007* (2013.01); *G06T 5/003* (2013.01); *G06T 11/001* (2013.01)

(58) Field of Classification Search
 CPC ..... G06T 17/20; G06T 3/4007; G06T 11/001; G06T 5/003
 See application file for complete search history.

(56) References Cited

U.S. PATENT DOCUMENTS

| 10,198,860 | B1* | 2/2019 | Smith | G06T 17/205 |
| 10,242,484 | B1* | 3/2019 | Cernigliaro | G06T 9/001 |
| 2006/0028466 | A1 | 2/2006 | Zhou et al. | |
| 2015/0035826 | A1 | 2/2015 | Tuffreau | |
| 2020/0226829 | A1 | 7/2020 | Szasz et al. | |

OTHER PUBLICATIONS

Othmani et al., 3D Geometric salient patterns analysis on 3D meshes, Jun. 18, 2019, arXiv:1906.07645v1, pp. 1-23 (Year: 2019).*

Batra V., Kilgard M. J., Kumar H., Lorach T.: Accelerating vector graphics rendering using the graphics hardware pipeline. ACM Transactions on Graphics 34, 4 (Jul. 2015), 146:1-146:15. URL: http://dl.acm.org/citation.cfm?doid=2809654.2766968, doi:10.1145/2766968.

(Continued)

*Primary Examiner* — Samantha (Yuehan) Wang
(74) *Attorney, Agent, or Firm* — Keller Jolley Preece

(57) ABSTRACT

The disclosure describes one or more embodiments of systems, methods, and non-transitory computer-readable media that utilize a sharpness map that includes information on how to filter a displacement map on a per-texel basis to preserve sharp features while sampling a displacement map. For instance, the disclosed systems utilize a sharpness map that encodes combinable patterns to represent discontinuities of features within a displacement map. In some embodiments, the disclosed systems generate a sharpness map having texels encoded with discontinuity configurations that are referenced to control filtering (e.g., via interpolation) of a displacement map such that sharp features within the displacement map are not lost (due to smoothing during interpolation). For example, the disclosed systems filter feature values of a displacement map using discontinuities identified within a sharpness map to interpolate when the feature value(s) and a sampling point are identified as being on the same side of a discontinuity.

20 Claims, 12 Drawing Sheets

(56) References Cited

OTHER PUBLICATIONS

Boubekeur T., Schlick C.: Generic mesh refinement on GPU. In Proceedings of the ACM SIGGRAPH/Eurographics conference on Graphics hardware—HWWS '05 (Los Angeles, California, 2005), ACM Press, p. 99. URL: http://portal.acm.org/citation.cfm?doid1071866.1071882, doi:10.1145/1071866.1071882.

Boubekeur T., Schlick C.: A Flexible Kernel for Adaptive Mesh Refinement on GPU. Computer Graphics Forum 27, 1 (Mar. 2008), 102-113. URL: http://doi.wiley.com/10.1111/j. 1467-8659.2007.01040.x, doi:10. 1111/j.1467-8659.2007.01040.x.

Core V., March P., Segal M., Frazier C.: The OpenGL Graphics System : A Specification. 94-100. May 28, 2009; URL: http://www.opengl.org/registry/doc/glspec40.core.20100311.pdf.

Cook R. L.: Computer Graphics vol. 18, No. 3, Jul. 1984. SIGGRAPH '84 Proceedings (1984), 223-231.

Corporation M.: Direct3D 11 Features. Tech. rep., 2009. URL: http://msdn.microsoft.com/en-us/library/windows/desktop/ff476342%28v=vs.85%29.aspx.

Eisenacher C., Meyer Q., Loop C.: Real-time view-dependent rendering of parametric surfaces. In Proceedings of the 2009 symposium on Interactive 3D graphics and games—I3D '09 (Boston, Massachusetts, 2009), ACM Press, p. 137. URL: http://portal.acm.org/citation.cfm?doid=1507149.1507172, doi:10.1145/1507149.1507172.

Ganacim F., Lima R. S., de Figueiredo L. H., Nehab D.: Massively-parallel vector graphics. ACM Transactions on Graphics 33, 6 (Nov. 2014), 1-14. URL: http://dl.acm.org/citation.cfm?doid=2661229.2661274, doi:10. 1145/2661229.2661274.

Gonzalez R. C., Woods R. E.: Digital Image Processing. 2007. Part 1.

Gonzalez R. C., Woods R. E.: Digital Image Processing. 2007. Part 2.

Hirche J., Ehlert A., Guthe S., Doggett M.: Hardware accelerated per-pixel displacement mapping. In Proceedings of Graphics Interface 2004 (School of Computer Science, University of Waterloo, Waterloo, Ontario, Canada, 2004), Gl '04, Canadian Human Computer Communications Society, pp. 153-158. URL: http://dl.acm.org/citation.cfm?id=1006058.1006077.

Kilgard M. J., Bolz J.: GPU—accelerated path rendering. ACM Trans-actions on Graphics 31, 6 (Nov. 2012), 1. URL: http://dl.acm.org/citation.cfm?doid=2366145.2366191, doi:10.1145/2366145.2366191.

Kaneko T., Takahei T., Inami M., Kawakami N., Yanagida Y., Maeda T., Tachi S.: Detailed shape representation with parallax mapping. In Proceedings of the ICAT 2001 (2001), pp. 205-208.

Loop C., Blinn J.: Resolution Independent Curve Rendering using Programmable Graphics Hardware. ACM Transactions on Graphics; Jul. 2005; https://doi.org/10.1145/1073204.1073303.

Lambert T., Benard P., Guennebaud G.: Multi-Resolution Meshes for Feature-Aware Hardware Tessellation. In Computer Graphics Forum (2016), vol. 35, Wiley Online Library, pp. 253-262.

Lambert T., Benard P., Guennebaud G.: A View-Dependent Metric for Patch-Based LOD Generation 8 Selection. Proceedings of the ACM on Computer Graphics and Interactive Techniques 1, 1 (Jul. 2018), 1-21. URL: http://dl.acm.org/citation.cfm?doid 3242771.3203195, doi:10. 1145/3203195.

McGuire M., McGuire M.: Steep parallax mapping. I3D 2005 Poster (2005). URL: http://www.cs.brown.edu/research/graphics/games/SteepParallax/index.html.

Nehab D., Hoppe H.: Random-access rendering of general vector graphics. ACM Transactions on Graphics 27, 5 (Dec. 2008), 1. URL: http://portal.acm.org/citation.cfm?doid=1409060.1409088, doi:10. 1145/1409060.1409088.

Niessner M., Keinert B., Fisher M., Stamminger M., Loop C., Schäfer H.: Real-time rendering techniques with hardware tessellation. Comput. Graph. Forum 35, 1 (Feb. 2016), 113-137. URL: https://doi.org/10.1111/cgf.12714, doi: 10.1111/cgf.12714.

Niessner M., Loop C.: Analytic displacement mapping using hardware tessellation. ACM Transactions on Graphics 32, 3 (Jun. 2013), 1-9. URL: http://dl.acm.org/citation.cfm?doid=2487228.2487234, doi:10. 1145/2487228.2487234.

Oh K., Ki H., Lee C.-H.: Pyramidal displacement mapping: A gpu based artifacts-free ray tracing through an image pyramid, Jan. 2006.

Patney A., Ebeida M. S., Owens J. D.: Parallel view-dependent tessellation of Catmull-Clark subdivision surfaces. In Proceedings of the 1st ACM conference on High Performance Graphics—HPG '09 (New Orleans, Louisiana, 2009), ACM Press, p. 99. URL: http://portal.acm.org/citation.cfm?doid=1572769.1572785, doi:10. 1145/1572769.1572785.

Parilov E., Zorin D.: Real-time rendering of textures with feature curves. ACM Transactions on Graphics 27, 1 (Mar. 2008), 1-15. URL: http://portal.acm.org/citation.cfm?doid=1330511.1330514, doi:10. 1145/1330511.1330514.

Ramanarayanan G., Bala K., Walter B.: Feature-Based Textures. 2004; URL http://www.graphics.cornell.edu/pubs/2004/RBW04.pdf.

Reshetov A., Luebke D.: Infinite Resolution Textures.; HPG '16: Proceedings of High Performance GraphicsJun. 2016 pp. 139-150; https://www.researchgate.net/publication/303939596.

Ray N., Neiger T., Levy B., Cavin X.: Vector Texture Maps on the GPU; Jul. 2008.

Sen P.: Silhouette maps for improved texture magnification. In Proceedings of the ACM SIGGRAPH/Eurographics conference on Graphics hardware (2004), ACM, pp. 65-73.

Szirmay-Kalos L., Umenhoffer T.: Displacement Mapping on the GPU—State of the Art. Computer Graphics Forum 27, 6 (Sep. 2008), 1567-1592. URL: http://doi.wiley.com/10.1111/j. 1467-8659.2007.01108.x, doi:10. 1111/j.1467-8659.2007.01108.x.

Schaefer H., Prus M., Meyer Q., Suessmuth J., Stamminger M.: Multiresolution Attributes for Hardware Tessellated Objects. IEEE Transactions on Visualization and Computer Graphics 19, 9 (Sep. 2013), 1488-1498. URL: http://ieeexplore.ieee.org/document/6470610/ doi:10.1109/TVCG.2013.44.

Schwarz M., Stamminger M.: Fast GPU-based Adaptive Tessellation with CUDA. Computer Graphics Forum 28, 2 (Apr. 2009), 365-374. URL: http://doi.wiley.com/10.1111/j. 1467-8659.2009.01376.x, doi:10. 1111/j.1467-8659.2009.01376.x.

Tatarchuk N.: Practical dynamic parallax occlusion mapping. In ACM SIGGRAPH 2005 Sketches (New York, NY, USA, 2005), SIGGRAPH '05, ACM. URL: http://doi.acm.org/10.1145/1187112.1187240, doi:10.1145/1187112.1187240.

Tatarchuk N.: Practical parallax occlusion mapping with approximate soft shadows for detailed surface rendering. In ACM SIGGRAPH 2006 Courses (New York, NY, USA, 2006), SIGGRAPH '06, ACM, pp. 81-112. URL: http://doi. acm.org/10.1145/1185657.1185830, doi:10.1145/1185657.1185830.

Tumblin J., Choudhury P.: Bixels: Picture samples with sharp embedded boundaries. In Rendering Techniques (2004), pp. 255-264.

Tarini M., Cignoni P.: Pinchmaps: textures with customizable discontinuities: Pinchmaps. Computer Graphics Forum 24, 3 (Sep. 2005), 557-568. URL: http://doi.wiley.com/10.1111/j.1467-8659.2005.00881.x, doi:10. 1111/j.1467-8659.2005.00881.x.

Technologies A.: Truform White Paper, May 2001 https://web.archive.org/web/20010612063404/http://www.ati.com/na/pages/technology/hardware/truform/truform_white_paper.html).

Welsh T., Corporation I.: Parallax mapping with offset limiting: A perpixel approximation of uneven surfaces, 2004.

Yerex K., Jagersand M.: Displacement mapping with ray-casting in hardware. In ACM SIGGRAPH 2004 Sketches (New York, NY, USA, 2004), SIGGRAPH '04, ACM, p. 149—. URL: http://doi.acm.org/10.1145/1186223.1186410, doi:10.1145/1186223.1186410.

H. Moreton: Watertight tessellation using forward differencing. In Proceedings of Graphics Hardware, 2001.

C. Green: Improved alpha-tested magnification for vector textures and special effects, in ACM SIGGRAPH 2007 courses, 2007.

Vlachos, J. Peters, C. Boyd, and J.L. Mitchell: Curved PN Triangles. In Proceedings of the symposium on Interactive 3D Graphics, 2001.

(56) References Cited

OTHER PUBLICATIONS

R.L. Cook: Shade Trees. SIGGRAPH Comput. Graph., 1984.
U.S. Appl. No. 16/953,829, Jan. 21, 2022, Preinterview 1st Office Action.

* cited by examiner

RENDERING TEXTURES UTILIZING SHARP DISPLACEMENT MAPPING

BACKGROUND

Recent years have seen a rapid increase in the use of computer graphics. In particular, digital content generated through the use of computer graphics techniques are increasingly utilized for a variety of applications (e.g., video games, videos such as animated films, and/or object libraries used in software tools of architecture, industrial design, video game development, virtual reality, augmented reality, and/or animation development). One such computer graphics technique is the use of tessellation and displacement map textures within a graphical processing unit (GPU) pipeline to create computer-generated textures and three-dimensional (3D) objects having detailed surface features.

As an example, while rendering 3D graphics objects in real time, the geometry of a 3D object can be decomposed into a macrostructure that defines a general shape of the 3D object through a polygon-based mesh, a microstructure having microgeometry that represents reflective properties of the 3D object (such as a Bidirectional Reflectance Distribution Function), and a mesostructure having high frequency details stored as surface offsets in a displacement map texture that form visible features of the 3D object. To generate a 3D object, many conventional graphics systems utilize a dedicated tessellation unit, on a GPU, controlled by programmable shaders to subdivide patches of a 3D-object mesh according to a tessellation pattern with positions of vertices being reconstructed along a normal direction from a displacement map. By utilizing a displacement map texture, many conventional systems achieve surface normal offsets representing depth and detail on surfaces of complex output 3D objects (in large scenes) in real time.

Unfortunately, despite recent advancements in utilizing displacement maps while rendering 3D graphics objects in real time, many conventional graphics systems that utilize displacement maps have a number of shortcomings with regard to accurately, efficiently, and flexibly rendering depth and detail on surfaces of complex 3D objects. For instance, many conventional graphics systems fail to accurately reproduce sharp features within textures using displacement maps. More specifically, conventional graphics systems often utilize bilinear or trilinear interpolation when sampling a displacement map for rendering of a 3D object. In many cases, such interpolation techniques smooth out sharp features represented in displacement map. Moreover, the resulting rendered 3D object often also includes smooth surface features instead of accurate depth and detail of features on the surfaces of the 3D object. Oftentimes, such conventional systems also render 3D objects that lead to blurry magnification of the 3D object due to the absence of sharp boundaries in the displacement map. In addition, conventional systems that utilize interpolation techniques with displacement maps also often inaccurately result in staircasing artifacts on the 3D object.

In order to address the issue of sharp features being smoothed while rendering a 3D object using a displacement map, many conventional systems preprocess a displacement texture to extract sharper features, but this excludes the preprocessed displacement texture from utilization in many real time applications. Furthermore, conventional systems oftentimes utilize vector graphics formats such as SVG due to their resolution independent properties. However, such vector graphics formats are traditionally rendered on a central processing unit (CPU) and rendering using vector graphics formats in the context of texture assets for 3D scenes on a GPU is an order of magnitude slower than utilizing a raster format. Accordingly, in order to improve accuracy, such conventional systems inefficiently reduce the speed at which 3D scenes are rendered. Furthermore, some conventional systems utilize a hybrid approach by sampling a raster format while using a vectorial representation to provide local resolution-independent features that is unable to efficiently and flexibly leverage the full potential of GPU texture units while rendering 3D objects.

In relation to image sampling, some conventional systems encode discontinuities to model sharp boundaries in images. For instance, some conventional systems attempt to encode discontinuities as a mesh in texture format for image sampling. These conventional systems are often inefficient in implementation and also inaccurately represent discontinuities. For instance, many conventional systems inefficiently encode discontinuities by including four points per texel in the grid mesh and accessing four sample values while using continuous interpolation based on patch functions. Furthermore, some conventional systems simplify an amount of information stored within the mesh having discontinuities such that the mesh introduces undesired (and inaccurate) discontinuities for certain configurations during interpolation of an image.

Furthermore, some conventional systems utilize an offset function to adjust the texture coordinates of a requested sample (from a sampled map) to shrink the texture space around features of the sampled map to avoid bilinear interpolations that cause smoothing in images. However, such conventional systems are rigid and unable to represent a T-junction discontinuity within a sampled map such that discontinuity artifacts are created between pixels. To resolve this obstacle, some conventional systems utilize more complex data structures that combine an array of curved segment and an additional texture storing per-pixel indices for the array. This complexity often results in inefficient processing time within a GPU pipeline.

SUMMARY

This disclosure describes one or more embodiments of systems, non-transitory computer readable media, and methods that solve one or more of the foregoing problems in addition to providing other benefits. In particular, the disclosed systems utilize a sharpness map that includes information on how to filter a (scalar) displacement map on a per-texel basis to preserve sharp features while sampling a displacement map. For instance, the disclosed systems utilize a sharpness map that encodes combinable patterns to represent discontinuities of features within a displacement map that are not aligned within a texture grid of the displacement map. More specifically, in some embodiments, the disclosed systems generate a sharpness map having texels encoded with infinite resolution discontinuity configurations (e.g., discontinuity points and lines) that are referenced to control filtering (e.g., via interpolation) of a displacement map such that sharp features within the displacement map are not lost (due to smoothing during interpolation). For example, to generate a displacement texture for a 3D object, the disclosed systems filter feature values (e.g., grayscale color values) of a displacement map using discontinuities identified within a sharpness map to interpolate when the feature value(s) and a sampling point are identified as being on the same side of a discontinuity. In this manner, the disclosed systems accurately, quickly, and flexibly utilize displacement maps to render 3D scenes by utilizing a data efficient sharpness map that accurately preserves sharp features of the displacement map without computationally burdening a GPU pipeline.

BRIEF DESCRIPTION OF THE DRAWINGS

The detailed description is described with reference to the accompanying drawings described below.

DETAILED DESCRIPTION

Figure 1:
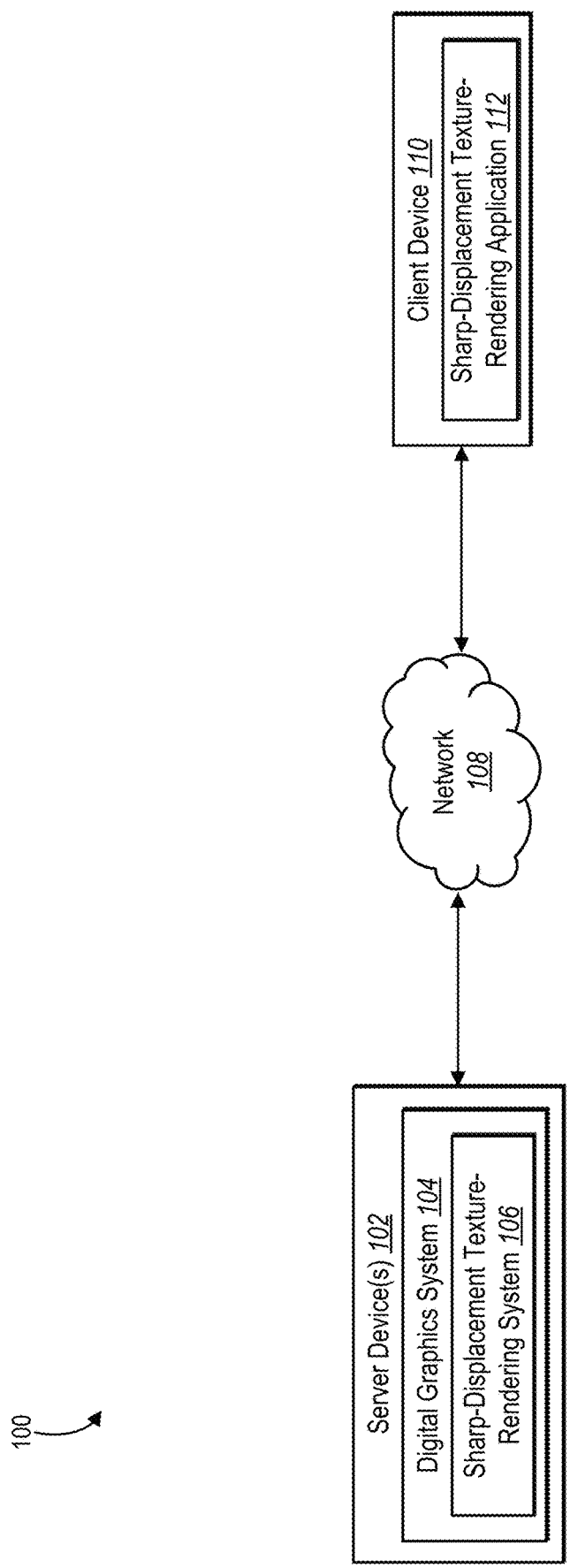
FIG. 1 illustrates a schematic diagram of an example system in which a sharp-displacement texture-rendering system can operate in accordance with one or more embodiments.

The disclosure describes one or more embodiments of a sharp-displacement texture-rendering system that generates a sharpness map encoded with discontinuities on a per-texel basis for use with a displacement map to preserve sharp features while filtering the displacement map to generate a 3D object. For instance, the sharp-displacement texture-rendering system accesses a 2D-displacement map having feature values that correspond to surface normal offsets for a 3D-object mesh. Furthermore, in some embodiments, the sharp-displacement texture-rendering system generates a 2D-sharpness map for the 2D-displacement map having texels encoded with one or more discontinuity lines that correspond to one or more discontinuities of the 2D-displacement map. In certain instances, the sharp-displacement texture-rendering system samples the 2D-displacement map based on the 2D-sharpness map to identify one or more feature values to filter from the 2D-displacement map. To sample the 2D-displacement map to identify feature values to filter, in some embodiments, the sharp-displacement texture-rendering system identifies a position of a texture sampling point within the 2D-displacement map and selects one or more feature values when the feature values are positioned on a same side of one or more discontinuity lines (from one or more texels of the 2D-sharpness map) as the position of the texture sampling point. Subsequently, to generate a filtered 2D-displacement texture to utilize for generating a 3D object, the sharp-displacement texture-rendering system only filters the identified feature values (e.g., via bilinear interpolation) within an area created by the one or more discontinuity lines and their positioning in reference to the 2D-displacement map.

As mentioned, in one or more embodiments, the sharp-displacement texture-rendering system generates a 2D-sharpness map for a 2D-displacement map. In some embodiments, the sharp-displacement texture-rendering system generates a 2D-sharpness map that includes texels encoded with one or more discontinuity points (for texel edges) and base discontinuity configurations with corresponding bit flags to generate discontinuity lines within the texels of the 2D-sharpness map. In certain instances, the sharp-displacement texture-rendering system also maps the 2D-sharpness in relation to a 2D-displacement map by shifting positional values of the 2D-sharpness map texels to associate the corner points (e.g., interpolation evaluation corner points) of the texels with feature values at the center of texels corresponding to a 2D-displacement map. Moreover, in some instances, the sharp-displacement texture-rendering system generates the 2D-sharpness map based on user selections of discontinuity lines in relation to a 2D-displacement map or by detecting the discontinuity lines in the 2D-displacement map utilizing a digital contour detector. Furthermore, in one or more embodiments, the sharp-displacement texture-rendering system produces varying resolutions of a 2D-sharpness map to match varying resolutions of a 2D-displacement map (e.g., due to mipmapping).

Additionally, in one or more embodiments, the sharp-displacement texture-rendering system samples a 2D-displacement map based on a 2D-sharpness map to identify one or more feature values to filter from the 2D-displacement map. For instance, the sharp-displacement texture-rendering system samples a 2D-displacement map to generate a displacement texture that is utilized with a 3D-object mesh to generate a 3D-object that depicts a surface based on surface normal offsets from the 2D-displacement texture. Indeed, in some instances, the sharp-displacement texture-rendering system utilizes a 2D-sharpness map encoded with discontinuities of the 2D-displacement map to sample the 2D-displacement map of feature values to filter.

When sampling the 2D-displacement map, in one or more embodiments, the sharp-displacement texture-rendering system maps the 2D-sharpness map in relation to the 2D-displacement map (e.g., with texel positions of the 2D-sharpness map shifted from texel positions of the 2D-displacement map). Then, in some embodiments, the sharp-displacement texture-rendering system identifies a position of a texture sampling point with the 2D-displacement map to select one or more feature values to utilize in filtering. In certain instances, the sharp-displacement texture-rendering system selects the one or more feature values when the feature values are positioned on a same side of one or more discontinuity lines (of the 2D-sharpness map) as the position of the texture sampling point. More specifically, in some embodiments, the sharp-displacement texture-rendering system selects feature values to filter at a texture sampling point position when the position of the texture sampling point and one or more interpolation evaluation corner points of a 2D-sharpness map texel are positioned within an area created by one or more discontinuity lines and edges of the texel.

Furthermore, in one or more embodiments, the sharp-displacement texture-rendering system filters the feature values identified during sampling to generate a filtered 2D-displacement texture. For instance, the sharp-displacement texture-rendering system filters the 2D-displacement map at the texture sampling point by interpolating (e.g., via bilinear interpolation) the feature values identified at the texture sampling point based on the discontinuity lines of the 2D-sharpness map. More specifically, in one or more embodiments, the sharp-displacement texture-rendering system filters identified feature values of a 2D-displacement map at an area created by one or more discontinuity lines and edges of a 2D-sharpness map texel while generating a filtered 2D-displacement texture. By doing so, the sharp-displacement texture-rendering system generates 2D-displacement textures that preserve sharp features such that, when applied to a 3D-object mesh, the resulting 3D objects depict surface normal offsets that represent accurate and sharp details on the 3D object's surface.

The disclosed sharp-displacement texture-rendering system provides a number of advantages over conventional systems. For example, by generating and utilizing a 2D-sharpness map that encode discontinuities of a 2D-displacement map, the sharp-displacement texture-rendering system accurately preserves sharp features of a 2D-displacement map while sampling the 2D-displacement map for a 3D-object mesh. More specifically, by filtering the 2D-displacement map based on discontinuities encoded in a 2D-sharpness map, in one or more embodiments, the sharp-displacement texture-rendering system utilizes bilinear interpolation without the displacement texture resulting in smooth features in place of sharp features where discontinuities exist. Consequently, the sharp-displacement texture-rendering system is able to render 3D objects from displacement textures that depict accurate and sharp surfaces and also are non-blurry during magnification.

Moreover, unlike many conventional systems, the sharp-displacement texture-rendering system accurately depicts sharp surfaces of 3D objects by preserving displacement map discontinuities with flexibility. For instance, the sharp-displacement texture-rendering system preserve sharp features of a displacement map without utilizing vector graphics formats and/or substantial modification to a GPU pipeline. Rather, in one or more embodiments, the sharp-displacement texture-rendering system utilizes a 2D-displacement map and a referencing 2D-sharpness map that is compatible with many standard GPU pipelines and, due to this compatibility, the sharp-displacement texture-rendering system is able to fully utilize resources of GPU texture units when rendering 3D objects from the 2D-displacement textures. Furthermore, unlike many conventional systems that utilize hybrid formats and/or complex data structures to preserve sharp features, the sharp-displacement texture-rendering system is able to utilize a 2D-sharpness map that includes texels encoded with a 6-wide bit mask capable of representing thirty-four discontinuity configurations to preserve sharp features of a 2D-displacement map with less data and complexity. Moreover, by generating an infinite resolution 2D-sharpness map using discontinuity points and base discontinuity configurations having bit flags, the sharp-displacement texture-rendering system is able to represent topological discontinuity lines of a 2D-displacement map (quickly) in real time due to the conservative memory requirement of the sharpness map.

In addition to accuracy and flexibility, the sharp-displacement texture-rendering system is also efficient. For example, due to generating the 2D-sharpness map including texels encoded with a 6-wide bit mask, the sharp-displacement texture-rendering system represents various discontinuity configurations for a 2D-displacement map with less data in the GPU pipeline. In some instances, as a result of generating a lightweight 2D-sharpness map to reference during sampling of a 2D-displacement map, the sharp-displacement texture-rendering system accurately renders sharp features of a displacement texture without substantially slowing down a GPU pipeline rendering process unlike conventional systems that substantially slow down speeds to achieve similar accuracies (e.g., a lower refresh rate of real-time applications).

Turning now to the figures, FIG. 1 illustrates a schematic diagram of one embodiment of a system 100 (or environment) in which a sharp-displacement texture-rendering system 106 can operate in accordance with one or more embodiments. As illustrated in FIG. 1, the system 100 includes server device(s) 102, a network 108, and a client device 110. As further illustrated in FIG. 1, the server device(s) 102 and the client device 110 communicate via the network 108.

As shown in FIG. 1, the server device(s) 102 include a digital graphics system 104 which further includes the sharp-displacement texture-rendering system 106. For instance, the server device(s) 102 includes, but is not limited to, a computing device (as explained below with reference to FIG. 12). In one or more embodiments, the sharp-displacement texture-rendering system 106 utilizes a 2D-displacement map. A 2D-displacement map (sometimes referred to as displacement map) refers to a texture or channel that stores feature values corresponding to surface normal offsets. In particular, in some embodiments, a displacement map includes a texture with a representation of one or more feature values for a surface that reflect varying magnitudes of surface normal offsets (e.g., a height). A feature value of a displacement map includes a data representation that represents a normal offset (e.g., a height). For instance, a feature value comprises a numerical and/or color value corresponding to a normal offset. For example, a displacement map includes scalar values (e.g., between 0 and 1 or between −1 and 1) or a full float value range that reflects a magnitude of surface normal offsets that are positioned in a texture to indicate at which position to introduce a normal offset and the appropriate amount of offset according to the value.

In one or more embodiments, the sharp-displacement texture-rendering system 106 is illustrated utilizing a displacement map that includes grayscale color values (e.g., from black to white) reflecting magnitudes of surface normal offsets that are positioned in a texture to indicate at which position to introduce a normal offset and the appropriate amount of offset according to the grayscale color value (e.g., black resulting in 0 offset and white resulting in a maximum offset). Thus, a surface normal offset is a change in height (or a total height) of a surface (of a texture) in a normal direction (e.g., normal to the surface represented by the texture). Although one or more embodiments illustrate utilizing a grayscale color value-based displacement map, in some embodiments, the sharp-displacement texture-rendering system 106 utilizes a variety of displacement maps including displacement maps that represent surface offsets as scalar values and/or full float value range.

A texture comprises a digital representation of a surface of a graphical object (e.g., a 3D-object polygonal mesh, a 3D object). For instance, a texture includes a set of mathematical (and/or algorithmic) information that renders or maps onto graphical objects and/or materials of varying sizes (e.g., textures created at runtime in a GPU pipeline). In some embodiments, a texture includes specific graphical information (e.g., color, patterns, shapes, visual illustrations, visual parameters) that map to a 3D-object mesh or 3D object (e.g., in real time).

In one or more embodiments, the sharp-displacement texture-rendering system 106 generates, for a displacement map, a 2D sharpness map that includes discontinuities present within the displacement map in accordance with one or more embodiments. A 2D-sharpness map (sometimes referred to as a "sharpness map") comprises one or more texels that represent discontinuities present within a corresponding displacement map. For example, a sharpness map includes one or more texels encoded with one or more discontinuity points and base discontinuity configurations that form one or more discontinuity lines (or edges) within the texels. Furthermore, in some embodiments, the sharp-displacement texture-rendering system utilizes the discontinuity lines of the sharpness map to filter a displacement map such that discontinuities between feature values of the displacement map are preserved (e.g., discontinuities along differing feature values). Generating and utilizing a sharpness map is described in greater detail below (e.g., in relation to FIGS. 2-8).

Moreover, in some embodiments, the sharp-displacement texture-rendering system 106 utilizes the sharpness map to filter the displacement map to generate a filtered 2D-displacement texture that preserves sharp features during rendering of a 3D object in accordance with one or more embodiments. A filtered 2D-displacement texture comprises a displacement representation of a surface of a graphical object. For example, a filtered 2D-displacement texture includes a texture generated from sampling and filtering a displacement map (using a sharpness map) to map to a 3D-object mesh of a rendered 3D object. In particular, in some embodiments, a filtered 2D-displacement texture includes a texture generated from a displacement map using a sharpness map to apply a pattern of the displacement map on a 3D-object mesh of varying sizes. In some instances, the sharp-displacement texture-rendering system 106 also displays a 3D object rendered using a filtered displacement texture on a graphical user interface of the client device 110 (e.g., via the sharp-displacement texture-rendering application 112).

Furthermore, as shown in FIG. 1, the system includes the client device 110. In one or more embodiments, the client device 110 includes, but is not limited to, a mobile device (e.g., smartphone, tablet), a laptop, a desktop, or any other type of computing device, including those explained below with reference to FIG. 12. In certain instances, although not shown in FIG. 1, the client device 110 is operated by a user to perform a variety of functions (e.g., via a sharp-displacement texture-rendering application 112). For example, the client device 110 performs functions such as, but not limited to, creating, storing, uploading, modifying, and/or displaying displacement maps, sharpness maps, 3D-object meshes, and/or 3D objects (or other digital content such as images and videos). Moreover, as shown in FIG. 1, the client device 110 communicates with the server device(s) 102 via the network 108.

In some embodiments, the client device 110 displays, within a graphical user interface, a 3D object rendered using a GPU pipeline. For instance, the client device displays a 3D object rendered using a displacement texture based on a sharpness map. In some instances, the client device 110 also displays, within a graphical user interface, a displacement map to receive user selections within the displacement map (e.g., via a user input tool) that indicate discontinuities within the displacement map. Indeed, in one or more embodiments, the sharp-displacement texture-rendering system 106 utilizes the received user selections to generate a sharpness map for the displacement map.

To access the functionalities of the sharp-displacement texture-rendering system 106 (as described above), in certain embodiments, a user interacts with the sharp-displacement texture-rendering application 112 on the client device 110. For example, the sharp-displacement texture-rendering system 106 includes one or more software applications (e.g., to generate a sharpness map or render a 3D object in accordance with one or more embodiments herein) installed on the client device 110. In some embodiments, the sharp-displacement texture-rendering application 112 is hosted on the server device(s) 102. In addition, when hosted on the server device(s) 102, the sharp-displacement texture-rendering application 112 is accessed by the client device 110 through web browser and/or another online interfacing platform and/or tool.

Although FIG. 1 illustrates the sharp-displacement texture-rendering system 106 being implemented by a particular component and/or device within the system 100 (e.g., the server device(s) 102), in some embodiments the sharp-displacement texture-rendering system 106 is implemented, in whole or in part, by other computing devices and/or components in the system 100. For instance, in some embodiments, the sharp-displacement texture-rendering system 106 is implemented on the client device 110. In particular, in some embodiments, the client device 110 generates a sharpness map for a displacement in accordance with one or more embodiments. Furthermore, in certain embodiments, the client device 110 (e.g., desktop or laptop computer, smartphone, tablet) utilizes the displacement map with the sharpness map in a GPU pipeline to filter the displacement map and generate a 3D object that preserves sharp features of the displacement map in accordance with one or more embodiments directly on the client device 110.

Additionally, as shown in FIG. 1, the system 100 includes the network 108. As mentioned above, in some instances, the network 108 enables communication between components of the system 100. In certain embodiments, the network 108 includes a suitable network and may communicate using any communication platforms and technologies suitable for transporting data and/or communication signals, examples of which are described with reference to FIG. 12. Furthermore, although FIG. 1 illustrates the server device(s) 102 and the client devices 110 communicating via the network 108, in certain embodiments, the various components of the system 100 communicate and/or interact via other methods (e.g., the server device(s) 102 and the client device 110 communicating directly).

Figure 2:
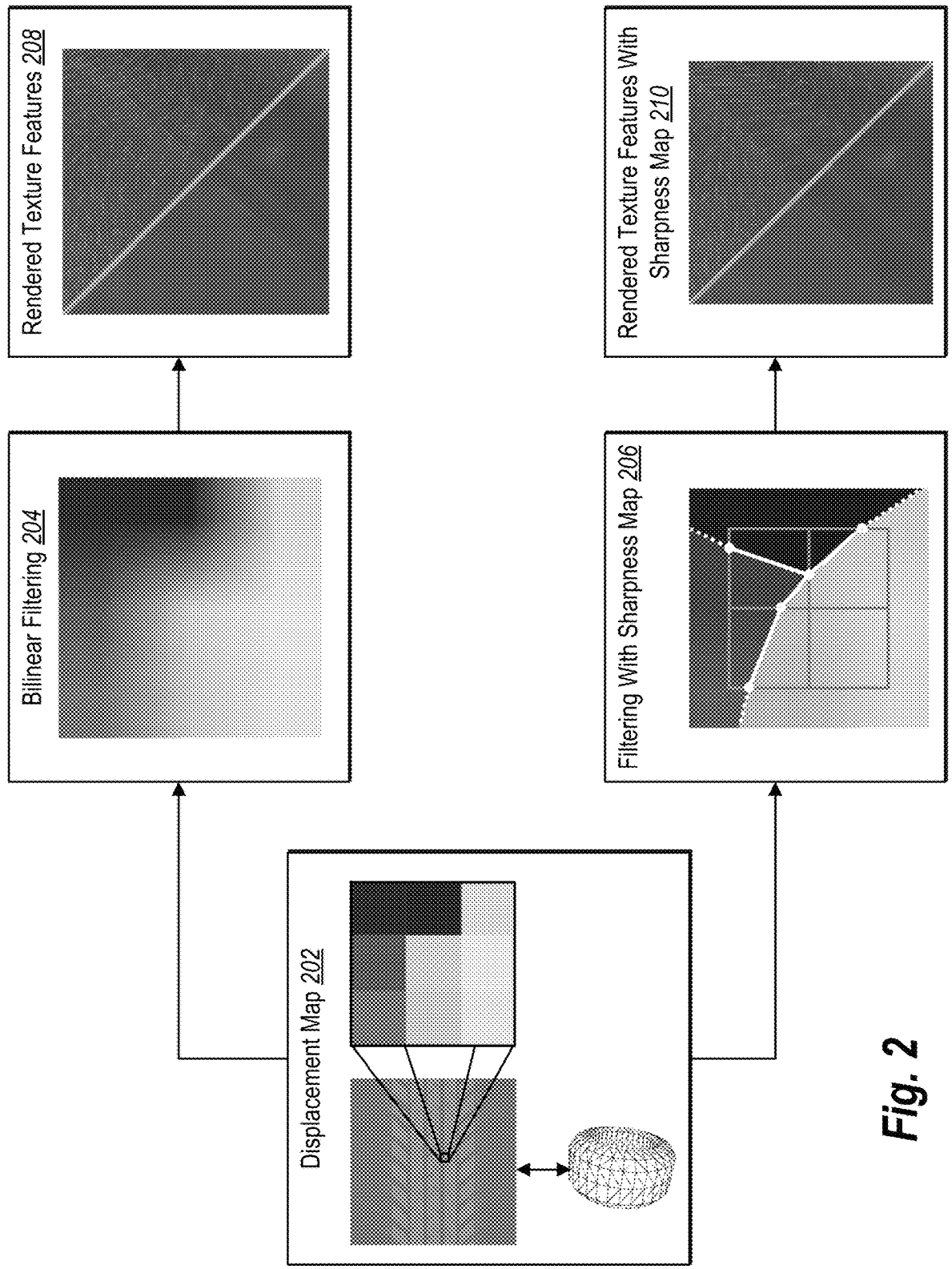
FIG. 2 illustrates an overview of a sharp-displacement texture-rendering system rendering a 3D object utilizing a displacement map and a sharpness map in accordance with one or more embodiments.

As previously mentioned, in one or more embodiments, the sharp-displacement texture-rendering system 106 generates a sharpness map encoded with discontinuities on a per-texel basis for a displacement map to preserve sharp features while filtering the displacement map to generate a 3D object. For instance, FIG. 2 illustrates an overview of the sharp-displacement texture-rendering system 106 utilizing a sharpness map with a displacement map to render a 3D object in comparison to utilizing a conventional approach with the displacement map to render a 3D object. As shown in FIG. 2, utilizing the sharpness map with the displacement map results in a 3D object having accurate depth and detail of displaced, sharp features on the surfaces of the 3D object.

Indeed, as illustrated in FIG. 2, a displacement map 202 includes feature values that correspond to surface normal offsets for a 3D-object mesh. More specifically, as shown in FIG. 2, the displacement map 202 includes grayscale color values that reflect varying magnitudes of surface normal offsets for a 3D-object mesh to create features on a surface of a 3D object. As an example, as shown in FIG. 2, the displacement map 202 includes grayscale color values (e.g., between a range of color values representing white, various gray colors, and black) that create surface normal offsets (e.g., differences in surface heights) to represent a tire tread pattern on the 3D-object mesh depicting a shape of a tire. To illustrate, the displacement map 202 causes a GPU pipeline to render visual attributes (e.g., materials, colors) of a texture at a greater height at locations of the displacement map that correspond to texels having lighter color values (e.g., white) while rendering visual attributes of a texture at a lesser height at locations of the displacement map that correspond to texels having darker color values (e.g., black).

Although FIG. 2 illustrates a grayscale color value-based displacement map, in some embodiments, the sharp-displacement texture-rendering system 106 utilizes a variety of displacement maps including displacement maps that represent surface offsets as scalar values and/or full float value range (as described above). Indeed, in some instances, a scale value-based displacement map causes a GPU pipeline to render visual attributes of a texture at a greater height at locations of the displacement map that corresponds to texels having larger scalar values while rendering visual attributes of a texture at a lesser height at locations of the displacement map that correspond to texels having smaller scalar values.

As shown in FIG. 2, in a conventional approach, a conventional system can access the displacement map 202 for a 3D object mesh and filter the displacement map using bilinear filtering 204. As shown in FIG. 2, utilizing bilinear filtering 204 with the displacement map 202 often smooths out sharp features represented in the displacement map 202 and, moreover, the resulting rendered texture features 208 of a 3D object also include smooth surface features instead of accurate depth and detail of the displaced features on the surfaces of the 3D object.

As further shown in FIG. 2, unlike the conventional approach, the sharp-displacement texture-rendering system 106 utilizes a sharpness map to preserve sharp features while filtering from the displacement map 202 to generate a 3D object. For example, as illustrated in FIG. 2, the sharp-displacement texture-rendering system 106 accesses the displacement map 202 for the 3D-object mesh and filters the displacement map 202 with a sharpness map in an act 206. As shown in the act 206 of FIG. 2, the sharpness map encodes discontinuities of the displacement map 202 such that the displacement map 202 is filtered using feature values that are present within an area created by the one or more discontinuities. Indeed, as illustrated in the act 206 of FIG. 2, the sharpness map preserves discontinuities by interpolating feature values of the displacement map 202 that are relevant to the areas created by the discontinuity lines from the sharpness map. By doing so, the sharp-displacement texture-rendering system 106 preserves sharp features of a displacement map 202 and the resulting rendered texture features with the sharpness map 210 of a 3D object depicts an accurate depth and detail of the displaced, sharp features on the surfaces of the 3D object.

Figure 3:
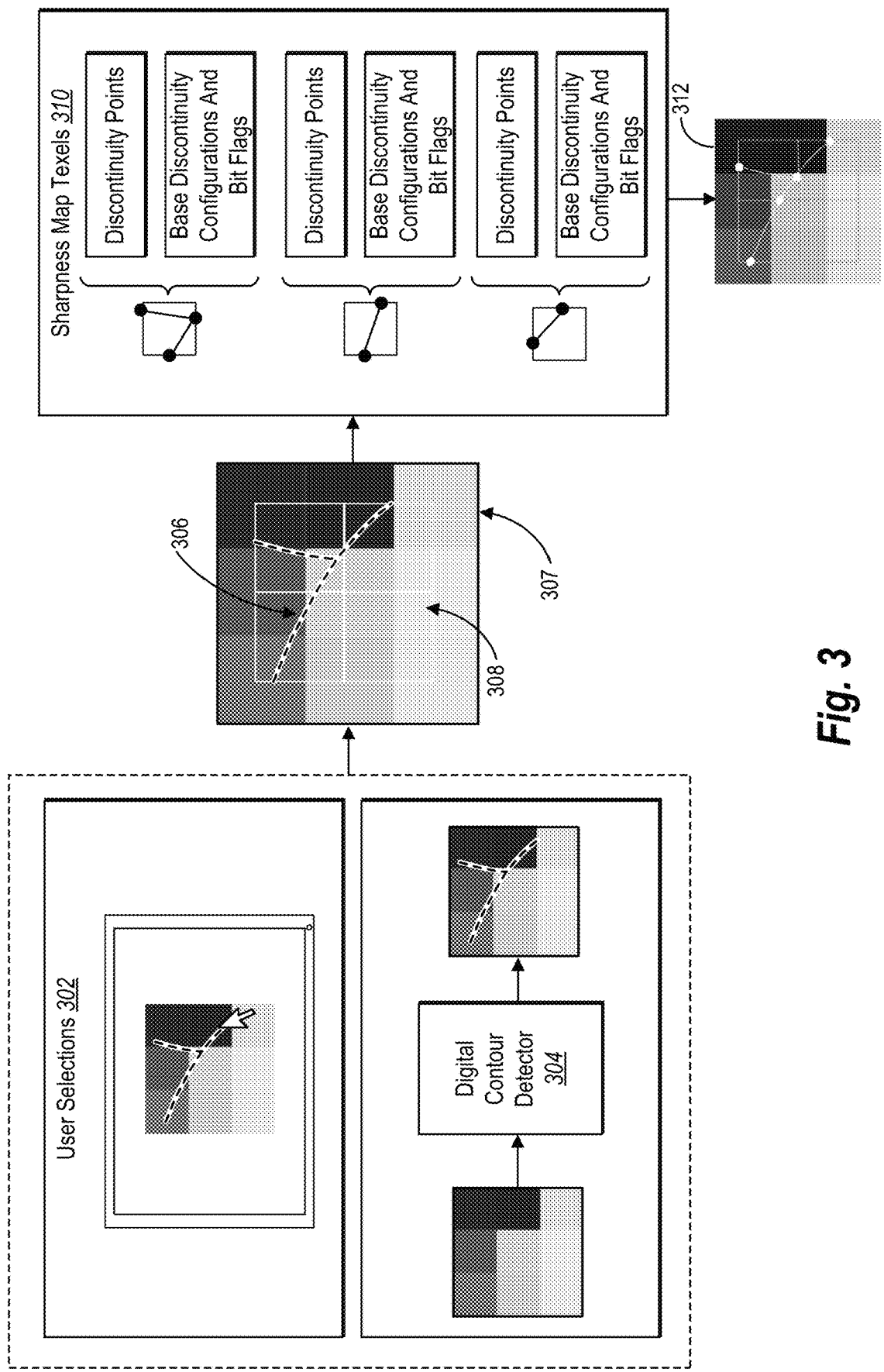
FIG. 3 illustrates a sharp-displacement texture-rendering system generating a sharpness map in accordance with one or more embodiments.

As mentioned above, in one or more embodiments, the sharp-displacement texture-rendering system 106 generates a sharpness map. For instance, FIG. 3 illustrates the sharp-displacement texture-rendering system 106 generating a sharpness map that encodes discontinuities corresponding to a displacement map. As shown in FIG. 3, the sharp-displacement texture-rendering system 106 receives (or identifies) discontinuity lines 306 within a displacement map 307 from user selections 302 and/or a digital contour detector 304. Then, as shown in FIG. 3, the sharp-displacement texture-rendering system 106 utilizes the identified discontinuity lines 306 to generate sharpness map texels 310 for a sharpness map. A texel comprises to a fundamental unit of a texture. For instance, a texture includes arrays of texels as elements to represent a texture space. In one or more embodiments, a texel comprises a grouping of pixels. In particular, a texel can include a block of pixels such as a four-by-four (4×4) block of pixels. A graphic processing unit (GPU) can utilize a texture or texture map comprising a plurality of texels to mapped pixels from the texture image to a surface of an object (e.g., can wrap the texture around the object).

As shown in FIG. 3, the sharp-displacement texture-rendering system 106 identifies one or more discontinuity points (using intersections with texel edges) from the discontinuity lines 306 and to generate the sharpness map texels 310. A discontinuity point comprises a point on an edge of a sharpness map texel to indicate a position at which a discontinuity line intersects the edge of the sharpness map texel. For instance, the sharp-displacement texture-rendering system encodes a discontinuity point within a sharpness map texel by encoding a positional value at a location on an edge of the sharpness map texel where a discontinuity (or discontinuity line) intersects (e.g., a texel edge length factor or an x and y coordinate value). Furthermore, as used herein, a discontinuity line (sometimes referred to as "discontinuity") comprises to a line (or edge) within a sharpness map texel between two or more discontinuity points on two or more edges of the sharpness map texel. In one or more embodiments, a discontinuity line within a sharpness map texel indicates a boundary (or sharp crease) to utilize in selectively filter feature values for a displacement map.

Indeed, as shown in FIG. 3, for each texel in the sharpness map texels 310, the sharp-displacement texture-rendering system 106 encodes one or more discontinuity points (as positional vertices) and base discontinuity configurations with bit flags to indicate how to generate discontinuity lines between the one or more discontinuity points. In one or more embodiments, the sharp-displacement texture-rendering system 106 encodes a base discontinuity configuration by setting a bit flag (e.g., setting a bit flag to 1) for a base discontinuity configuration that corresponds to the identified discontinuity line from the identified discontinuity lines 306 for each texel in the sharpness map texels 310. As further shown in FIG. 3, the sharp-displacement texture-rendering system 106 utilizes the discontinuity points and base discontinuity configurations and bit flags encoded within the sharpness map texels 310 to generate the sharpness map 312.

As mentioned above and as shown in FIG. 3, in some instances, sharp-displacement texture-rendering system 106 receives discontinuity lines for a displacement map based on user selections of one or more discontinuity lines (e.g., user selections 302). For instance, the sharp-displacement texture-rendering system 106 displays, within a graphical user interface of a client device, a displacement map. Indeed, in some embodiments, the sharp-displacement texture-rendering system 106 provides zooming capabilities for the displayed displacement map and displays the displacement map at various levels of detail based on the zoom magnification settings. For instance, as shown in FIG. 3, the sharp-displacement texture-rendering system 106 displays the displacement map within a graphical user interface of a client device at a texel level (e.g., texels of the displacement map are viewable).

In some embodiments, the sharp-displacement texture-rendering system 106 receives user interactions from the graphical user interface displaying the displacement map. For instance, the sharp-displacement texture-rendering system 106 receives user selections within the displayed displacement map that identify user selected discontinuity lines for the displayed displacement map. In some embodiments, the sharp-displacement texture-rendering system 106 detects, within the graphical user interface of the client device, user interactions signaling a drawing (or tracing) of a discontinuity line within the displacement map. For example, the user interactions include user interactions from user input tools such as, but not limited to, a cursor, a digital pen, and/or coordinate inputs (for vertex positions of discontinuity lines). In certain instances, the sharp-displacement texture-rendering system 106 stores (or saves) positions of discontinuity lines, received from (or drawn by) a user interacting with the displayed displacement map, in reference to the displacement map.

In some embodiments, the sharp-displacement texture-rendering system 106 detects, within the graphical user interface of the client device, user interactions signaling a selection of one or more discontinuity points within the displacement map. For instance, the sharp-displacement texture-rendering system 106 receives user selections of points (or vertices) within the displayed displacement map. Then, in some embodiments, the sharp-displacement texture-rendering system 106 connects the user selected points to form discontinuity lines for the displayed displacement map.

Indeed, in one or more embodiments, the sharp-displacement texture-rendering system 106 receives user selected discontinuity lines (or points) received in reference to a displayed displacement map that create discontinuities (or separations) between differing feature values (e.g., visually noticeable differences between feature values of the displacement map). To illustrate as an example, the sharp-displacement texture-rendering system 106 receives a user selection of a line (e.g., via a user drawing a line within a displayed displacement map) that draws a discontinuity line between a first set of feature values and a second set of feature values that cause a visual crease, cliff, border, or contrast within the displacement map (e.g., via grayscale color differences). In one or more embodiments, the received discontinuity lines are encoded within texels of a sharpness map (e.g., as discontinuity points and base discontinuity configurations with bit flags) by the sharp-displacement texture-rendering system 106 as described in greater detail below.

As further mentioned above and as shown in FIG. 3, in some embodiments, the sharp-displacement texture-rendering system 106 detects one or more discontinuity lines for a displacement map utilizing the digital contour detector 304. For instance, in one or more embodiments, the sharp-displacement texture-rendering system 106 provides, as input, a displacement map to a digital contour detector.

Then, in some instances, the sharp-displacement texture-rendering system 106 utilizes the digital contour detector to detect differing feature values among the feature values of the displacement map. Indeed, in some instances, the sharp-displacement texture-rendering system 106 utilizes the digital contour detector to detect visual creases, cliffs, borders, or contrasts within the displacement map. Furthermore, the sharp-displacement texture-rendering system 106 utilizes the digital contour detector to identify (or draw) discontinuity lines at the detected differing feature values among the feature values of the displacement map. In one or more embodiments, the detected discontinuity lines from the digital contour detector are encoded within texels of a sharpness map (e.g., as discontinuity points and base discontinuity configurations with bit flags) by the sharp-displacement texture-rendering system 106 as described in greater detail below.

In some instances, the sharp-displacement texture-rendering system 106 utilizes a digital contour detector that detects edges (within images and/or textures) utilizing an edge detection algorithm. For instance, the sharp-displacement texture-rendering system 106 utilizes various digital contour detectors based on one or more of a Prewitt-filter edge detection algorithm, a Sobel-filter edge detection algorithm, and/or a Canny-filter edge detection algorithm. In some embodiments, the sharp-displacement texture-rendering system 106 utilizes the digital contour detector to detect edges within a displacement map between differing feature values among the feature values of the displacement map. Furthermore, in certain instances, the sharp-displacement texture-rendering system 106 utilizes the detected edges as discontinuity lines or generates discontinuity lines for the displacement map that correspond to the edges detected by the digital contour detector.

In addition to (or in combination with) user selections and digital contour detectors, the sharp-displacement texture-rendering system 106 in some embodiments utilizes a variety of other tools to identify discontinuity lines with a displacement map. For instance, in some embodiments, the sharp-displacement texture-rendering system 106 identifies regions, edges, or objects within a displacement map utilizing segmentation tools and/or detection tools. As an example, the sharp-displacement texture-rendering system 106 utilizes machine learning-based (e.g., neural networks) segmentation tools and/or detection tools to identify one or more regions, edges, or objects within a displacement map. Subsequently, in one or more embodiments, the sharp-displacement texture-rendering system 106 utilizes the identified regions, edges, or objects within a displacement map to generates discontinuity lines for the displacement map. In one or more embodiments, the detected discontinuity lines generated from identified regions, edges, or objects within the displacement map are encoded within texels of a sharpness map (e.g., as discontinuity points and base discontinuity configurations with bit flags) by the sharp-displacement texture-rendering system 106 as described in greater detail below.

As also shown in FIG. 3, the sharp-displacement texture-rendering system 106 identifies positioning of discontinuity lines 306 in relation to the displacement map 307. For example, the sharp-displacement texture-rendering system 106 utilizes x and y coordinates for the displacement map 307 and maps the discontinuity lines 306 by assigning x and y coordinate positions for the discontinuity lines 306 in relation to the displacement map 307. Although FIG. 3 illustrates the sharp-displacement texture-rendering system 106 overlaying the discontinuity lines 306 on the displacement map 307, the sharp-displacement texture-rendering system 106, in some instances, maintains positional relationships between discontinuity lines and displacement maps based on references of positional data (e.g., x and y coordinates) of both the displacement map and the discontinuity lines.

Furthermore, in some embodiments, the sharp-displacement texture-rendering system 106 also maps a sharpness map in relation to a displacement map. For instance, as shown in FIG. 3, the sharp-displacement texture-rendering system 106 maps one or more texels of a sharpness map by assigning x and y coordinate positions for texels of the sharpness map in relation to the displacement map 307. Although FIG. 3 illustrates the sharp-displacement texture-rendering system 106 overlaying a sharpness map on a displacement map in one or more embodiments, the sharp-displacement texture-rendering system 106, in some instances, maintains positional relationships between sharpness maps and displacement maps based on references of positional data (e.g., x and y coordinates) of both the displacement map and the sharpness map.

In some instances, texels of a sharpness map are shifted in relation to (texels of) a displacement map by the sharp-displacement texture-rendering system 106. For example, the sharp-displacement texture-rendering system 106 shifts positional values of texels of a sharpness map to associate the corners of the sharpness map texels (e.g., the interpolation evaluation corner points) with feature values of a displacement map. An interpolation evaluation corner point refers to a point (or vertex) of a texel at which a location is referenced for an evaluation sample to filter a displacement map. For example, an interpolation evaluation corner point comprises a point of a sharpness map texel that is positioned within a feature value of a displacement map such that the feature value is referenced using the position of the sharpness map texel point (i.e., corner point).

In some embodiments, the sharp-displacement texture-rendering system 106 shifts positional values of texels of a sharpness map to associate the corners of the sharpness map texels (e.g., the interpolation evaluation corner points) with feature values that correspond to centers of texels of displacement maps. In certain instances, the sharp-displacement texture-rendering system 106 shifts texels of a sharpness map by half a texel length in the x and y coordinate direction so that corner points of the sharpness map texels correspond feature value evaluation points of the displacement map. As shown in FIG. 3, the sharp-displacement texture-rendering system 106 shifts positional values of texels of a sharpness map to create the shifted sharpness map 308. By doing so, in some embodiments, the sharp-displacement texture-rendering system 106 stores (or encodes) discontinuities between four adjacent texels of a displacement map in each texel of a sharpness map.

Furthermore, in some embodiments and in relation to FIG. 3, the sharp-displacement texture-rendering system 106 identifies positioning of the identified discontinuity lines 306 in relation to the shifted sharpness map 308. Then, in one or more embodiments, the sharp-displacement texture-rendering system 106 identifies discontinuity points along edges of texels corresponding to the shifted sharpness map 308. For example, the sharp-displacement texture-rendering system 106 identifies a location (e.g., in terms of a texel edge length factor or x and y coordinates) at which the identified discontinuity lines 306 intersect with texel edges of the shifted sharpness map 308 as the discontinuity points.

In one or more embodiments, the sharp-displacement texture-rendering system 106 encodes an identified discontinuity point (e.g., using a position value) to one or more texels of the shifted sharpness map 308 for an edge intersecting with the discontinuity point. As shown in FIG. 3, the sharp-displacement texture-rendering system 106 encodes discontinuity points for each texel in the sharpness map texels 310 based on a positioning of a discontinuity point along an edge of a texel. For instance, the sharp-displacement texture-rendering system 106 includes positional values of discontinuity points as data encoded within a sharpness map texel for each discontinuity point associated with the sharpness map texel. For instance, the sharp-displacement texture-rendering system 106 encodes a texel edge length factor to an edge of a sharpness map texel to indicate a positioning of discontinuity point. In particular, in some embodiments, the sharp-displacement texture-rendering system 106 utilizes a factor $\beta$ to indicate a position or length at which a discontinuity point is located on a left or right edge of a sharpness map texel. Moreover, in some embodiments, the sharp-displacement texture-rendering system 106 utilizes a factor $\alpha$ to indicate a position or length at which a discontinuity point is located on a bottom or top edge of a sharpness map texel. In some instances, the sharp-displacement texture-rendering system 106 stores location values for the discontinuity paths as x and y coordinate float values.

In some embodiments, the sharp-displacement texture-rendering system 106 condenses memory per texel by storing (or encoding) less discontinuity points per sharpness map texel than the number of discontinuity points associated with each sharpness map texel. In particular, in certain instances, the sharp-displacement texture-rendering system 106 encodes a discontinuity point positioned on a bottom-side edge of a sharpness map texel and/or a discontinuity point positioned on a left-side edge of a sharpness map texel. Then, in one or more embodiments, the sharp-displacement texture-rendering system 106 retrieves discontinuity point locations for the top-side edge and right-side edge of the immediate sharpness map texel from top and right adjacent sharpness map texels that shares edges with the immediate sharpness map texel. By referencing adjacent sharpness map texels to retrieve one or more discontinuity points for each immediate texel, in some embodiments, the sharp-displacement texture-rendering system 106 stores two or less discontinuity points per sharpness map texel.

Figure 5:
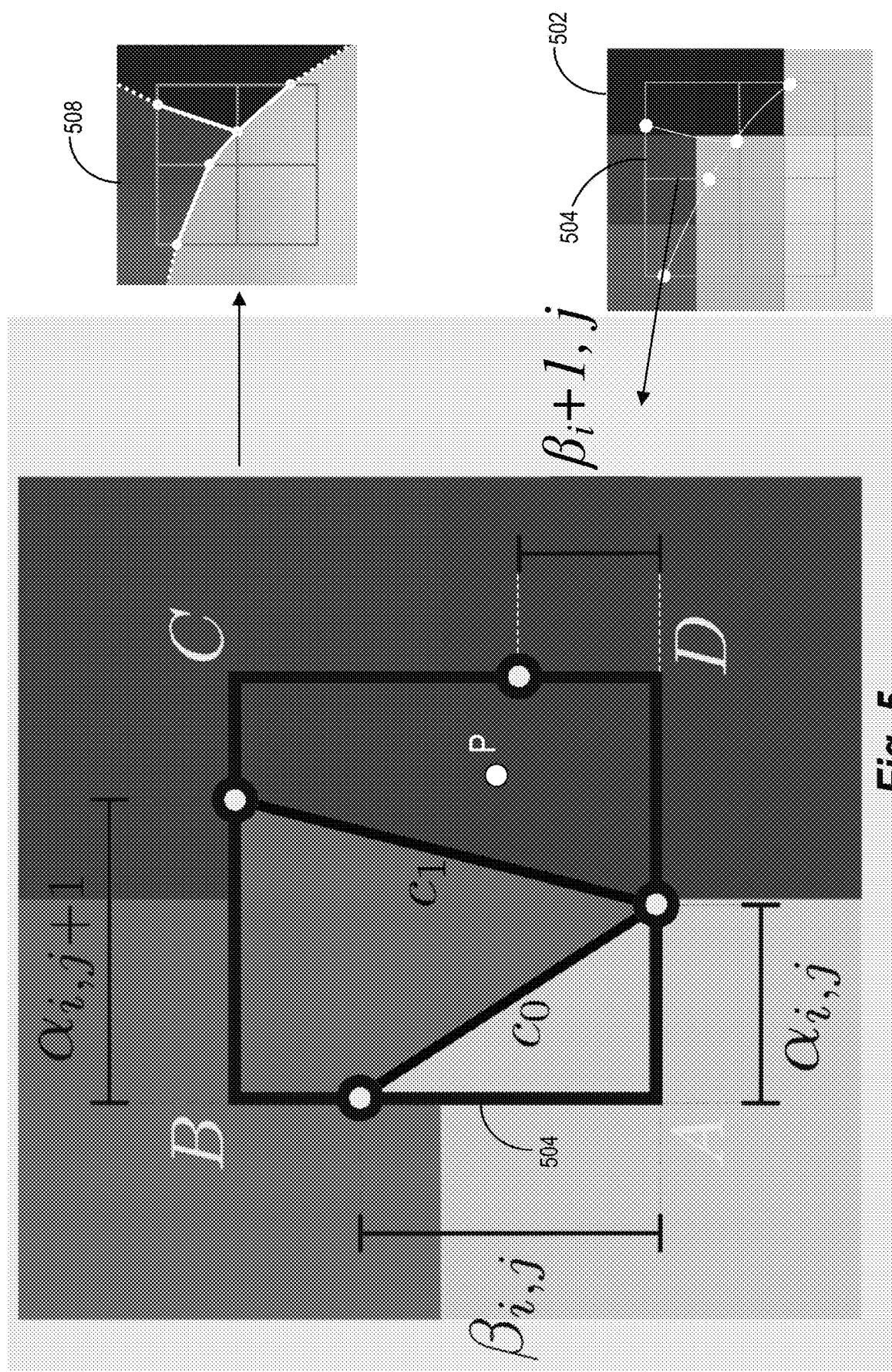
FIG. 5 illustrates a sharp-displacement texture-rendering system utilizing a sharpness map to filter a displacement map in accordance with one or more embodiments.

In particular, in one or more embodiments, the sharp-displacement texture-rendering system 106 encodes an edge length factor $\beta_{i,j}$ for a left-side edge of a sharpness map texel (i, j) to indicate the position of the discontinuity point on the left-side edge of a sharpness map texel. Likewise, in one or more embodiments, the sharp-displacement texture-rendering system 106 encodes an edge length factor $\beta_{i+1,j}$ for a left-side edge of a right adjacent sharpness map texel (i+1, j) to indicate the position of the discontinuity point on the right-side edge of the sharpness map texel (i, j). Moreover, in some embodiments, the sharp-displacement texture-rendering system 106 encodes an edge length factor $\alpha_{i,j}$ for a bottom-side edge of the sharpness map texel (i,j) to indicate the position of the discontinuity point on the bottom-side edge of the sharpness map texel. Furthermore, in some instances, the sharp-displacement texture-rendering system 106 encodes an edge length factor $\alpha_{i,j+1}$ for a bottom-side edge of a top adjacent sharpness map texel (i,j+1) to indicate the position of the discontinuity point on the top-side edge of the sharpness map texel (i,j). For example, FIG. 5 illustrates an example of edge length factors $\beta_{i,j}$ and $\alpha_{i,j}$ for discontinuity point locations of a sharpness map texel (i,j) and edge length factors and $\alpha_{i,j+i}$ for adjacent sharpness map texels (i+1, j) and (i,j+1).

Although the above-described embodiments illustrate the sharp-displacement texture-rendering system 106 encoding discontinuity points positioned on a bottom-side edge and/or a left-side edge of a sharpness map texel, the sharp-displacement texture-rendering system 106 in some instances encodes discontinuity points positioned on top-side edge and/or a right-side edge of the sharpness map texel. In such cases, the sharp-displacement texture-rendering system 106 retrieves discontinuity points for the bottom-side edge and the left-side edge from bottom and left adjacent sharpness map texels that shares edges with the immediate sharpness map texel.

As also shown in FIG. 3, the sharp-displacement texture-rendering system 106 also encodes base discontinuity configurations for the sharpness map texels 310. For example, the sharp-displacement texture-rendering system 106 stores multiple base discontinuity configurations and a bit flag that indicates the presence or absence of each base discontinuity configuration per sharpness map texel. Indeed, in one or more embodiments, a base discontinuity configuration references a possible discontinuity line that is created by connecting two discontinuity points from two of the edges of a sharpness map texel. For instance, the sharp-displacement texture-rendering system 106 encodes six base discontinuity configurations with a corresponding bit flag within a sharpness map texel. As an example, the sharp-displacement texture-rendering system 106 utilizes base discontinuity configurations and bit flags as illustrated in FIG. 4.

In one or more embodiments, the sharp-displacement texture-rendering system 106 identifies discontinuity line connections between two discontinuity points in a sharpness map texel using the discontinuity lines 306. Then, in one or more embodiments, identifies a matching base discontinuity configuration for the discontinuity line between the two discontinuity points and sets a bit flag to indicate that the matching base discontinuity configuration is present for the sharpness map texel. Indeed, in one or more embodiments, the sharp-displacement texture-rendering system 106 checks each base discontinuity configuration against the identified discontinuity lines created in a sharpness map texel to set bit flags for each matching base discontinuity configuration. Furthermore, in one or more embodiments, the sharp-displacement texture-rendering system 106 is able to generate discontinuity lines of a sharpness map within a GPU pipeline by utilizing the discontinuity points and base discontinuity configurations with bit flags encoded in the sharpness map texels (e.g., to form the sharpness map 312).

As just mentioned, in some embodiments, the sharp-displacement texture-rendering system 106 utilizes discontinuity points (locations) and base discontinuity configurations with bit flags encoded in sharpness map texels of a sharpness map to generate (or reconstruct) discontinuity lines per texel for the topology of a sharpness map while filtering a displacement map in a GPU pipeline. For example, FIG. 4 illustrates utilizing data encoded within a texel of a sharpness map to generate discontinuity lines for the sharpness map texel (to generate discontinuity lines for the sharpness map). As shown in FIG. 4, the identifies a sharpness map 402 in relation to a displacement map 404. Then, as illustrated in FIG. 4, the sharp-displacement texture-rendering system 106 accesses sharpness map texel data 408 for a sharpness map texel 406 from the sharpness map 402. Indeed, as shown in FIG. 4, the sharpness map texel data 408 includes encoded discontinuity points 410 and base discontinuity configurations 412 (with bit flags) for which discontinuity line combinations 414 are possible.

Figure 4:
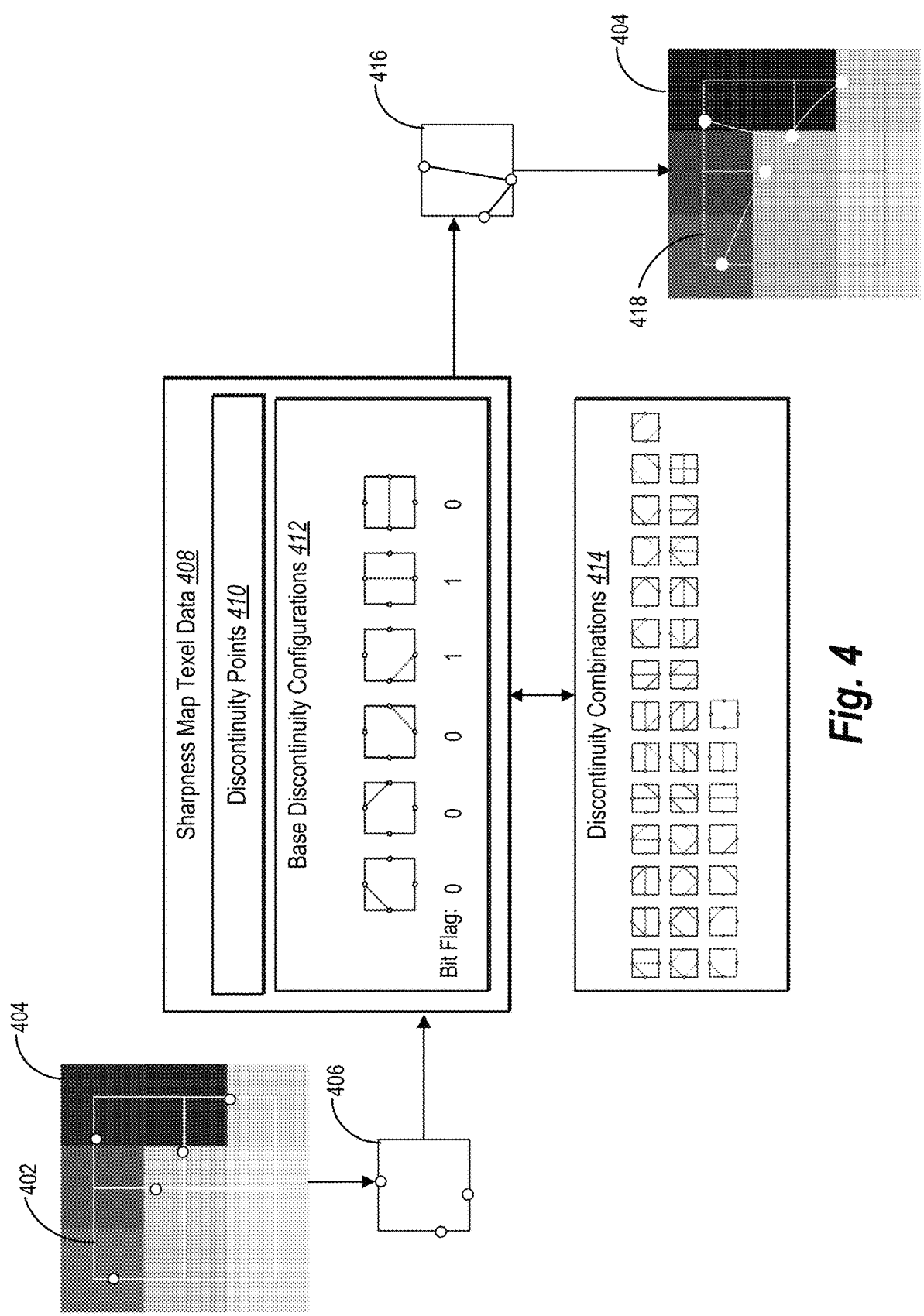
FIG. 4 illustrates a sharp-displacement texture-rendering system reconstructing discontinuities encoded within a sharpness map in accordance with one or more embodiments.

As illustrated in FIG. 4, the base discontinuity configurations 412 of the sharpness map texel 406 reference possible discontinuity lines that are created by connecting two discontinuity points from two of the edges of a sharpness map texel and a corresponding bit flag to indicate that the presence of the possible discontinuity lines. As further shown in FIG. 4, the base discontinuity configuration (from the base discontinuity configurations 412) having a discontinuity line between a bottom-side edge and left-side edge of a sharpness map texel corresponds to a bit flag of 1. As also illustrated in FIG. 4, the base discontinuity configuration having a discontinuity line between a bottom-side edge and a top-side edge of a sharpness map texel corresponds to a bit flag of 1. Accordingly, as shown in FIG. 4, the sharp-displacement texture-rendering system 106 generates a discontinuity line combination 416 for the sharpness map texel 406. Indeed, in one or more embodiments, the sharp-displacement texture-rendering system 106 utilizes base discontinuity configurations for a sharpness map texel that correspond to a bit flag that indicates the presence of a given base discontinuity configuration (e.g., a bit flag of 1 or true) while disregarding base discontinuity configurations corresponding to a bit flag that indicates the absence of a given base discontinuity configuration (e.g., a bit flag of 0 or false).

As further shown in FIG. 4, the sharp-displacement texture-rendering system 106 utilizes discontinuity points (locations) and base discontinuity configurations with bit flags encoded in sharpness map texels of a sharpness map to generate (or reconstruct) discontinuity lines per texel present in the sharpness map 402. By doing so, as shown in FIG. 4, the sharp-displacement texture-rendering system 106 generates discontinuity lines for a sharpness map 418 to indicate discontinuities in the displacement map 404. Indeed, as illustrated in FIG. 4, the sharp-displacement texture-rendering system 106 is able to generate discontinuity line combinations 414 for each sharpness map texel by utilizing varying base discontinuity configurations depending on bit flag settings encoded for each of the sharpness map texels. Moreover, as shown in FIG. 4, by generating discontinuity lines from data encoded on each texel of the sharpness map, the sharp-displacement texture-rendering system 106 generates the sharpness map 418 having a topology with discontinuity lines referencing the discontinuities of the displacement map 404.

In some embodiments, the sharp-displacement texture-rendering system 106 ensures that any given area (or region) within a sharpness map texel is associated with at least one corner of the sharpness map texel. For instance, the sharp-displacement texture-rendering system 106 identifies a set of invalid discontinuity line combinations in which generated discontinuity lines will result in an area within the sharpness map texel that is not adjacent to any corner of the sharpness map texel. In some embodiments, the sharp-displacement texture-rendering system 106 identifies discontinuity line combinations that create a triangular or diamond-shaped area, within a sharpness map texel, that is not adjacent to any corner point of the sharpness map texel as an invalid discontinuity line combination.

In certain embodiments, the sharp-displacement texture-rendering system 106 utilizes a 6-bit wide mask to encode base discontinuity configurations. For instance, in reference to FIG. 4, the sharp-displacement texture-rendering system 106 encodes each bit of a 6-bit wide mask with each base discontinuity configuration from the base discontinuity configurations 412. More specifically, in some embodiments, the sharp-displacement texture-rendering system 106 associates each bit of a 6-bit wide mask with a particular base discontinuity configuration (e.g., a first bit associates with a first base discontinuity configuration, a second bit associates with a second base discontinuity configuration . . . a sixth bit associates with a sixth base discontinuity configuration). Then, in one or more embodiments, for each bit, the sharp-displacement texture-rendering system 106 sets a bit (as a bit flag) to 0 when the corresponding base discontinuity configuration is absent and to 1 when the corresponding base discontinuity configuration is present. As such, in certain instances, the sharp-displacement texture-rendering system 106 is able to represent at least thirty-four discontinuity line combinations (as shown in FIG. 4) in a sharpness map texel while utilizing 6-bits of memory per sharpness map texel (in addition to memory to store discontinuity points).

As mentioned above, in one or more embodiments, the sharp-displacement texture-rendering system 106 samples a displacement map based on a sharpness map to identify one or more feature values to filter from the displacement map and then filters the feature values identified during sampling to generate a filtered displacement texture. For instance, the sharp-displacement texture-rendering system 106 samples a displacement map based on a sharpness map to identify one or more feature points to filter by identifying a position of a texture sampling point within the displacement map and selecting, from the displacement map, the one or more feature values positioned on a same side of one or more discontinuity lines of a texel of the sharpness map as the position of the texture sampling point.

More specifically, in some embodiments, the sharp-displacement texture-rendering system 106 identifies that a position of the texture sampling point and one or more interpolation evaluation corner points of the sharpness map texel are positioned within an area (or region) created by the one or more discontinuity lines and one or more edges of the sharpness map texel. Then, in one or more embodiments, the sharp-displacement texture-rendering system 106 selects the identified one or more feature values of the displacement map that correspond to the one or more interpolation evaluation corner points of the sharpness map texel that are positioned within the created area. Subsequently, in some embodiments, the sharp-displacement texture-rendering system 106 filters the identified one or more feature values within the created area to generate a filtered displacement texture that preserves discontinuities between feature values of the displacement map. Filtering refers to an evaluation of one or more features of a displacement map to generate an output feature in a displacement texture for rendering a 3D object. For instance, filtering comprises an interpolation of one or more features of a displacement map to produce a visual (or renderable) output within a displacement texture for a rendered 3D object. As an example, the sharp-displacement texture-rendering system filters a displacement map by interpolating (e.g., using bilinear or trilinear interpolation) one or more feature values of the displacement map. In some instances, the sharp-displacement texture-rendering system filters a displacement map by interpolating only feature values of the displacement map that are on the same side of a discontinuity indicated by a sharpness map at a given texture sampling point.

For instance, FIG. 5 illustrates the sharp-displacement texture-rendering system 106 utilizing a sharpness map (e.g., a sharpness map texel 504) with a displacement map 502 to filter the displacement map. As shown in FIG. 5, the sharp-displacement texture-rendering system 106 maps a sharpness map texel 504 having interpolation evaluation corner points A, B, C, and D in relation to texels of a displacement map 502 (e.g., four adjacent texels of the displacement map). As illustrated in FIG. 5, the sharp-displacement texture-rendering system 106 samples texels of the displacement map 502 at a texture sampling point P by selecting feature values (e.g., grayscale color values) associated with interpolation evaluation corner points C and D (of the sharpness map texel 504) to filter from the displacement map 502 because the interpolation evaluation corner points C and D are positioned on the same side (or region) of a discontinuity $c_1$.

Indeed, as shown in FIG. 5, the sharp-displacement texture-rendering system 106 filters the displacement map 502 at the sampling point P by filtering the grayscale color values associated with the interpolation evaluation corner points C and D inside the sharpness map texel 504. For instance, as shown in FIG. 5, the sharp-displacement texture-rendering system 106 filters the identified grayscale color values associated with the interpolation evaluation corner points C and D within the area (or region) created by discontinuity $c_1$ and the edges of the sharpness map texel 504 to generate a filtered displacement texture 508 that preserves discontinuities between feature values (e.g., grayscale color values) of the displacement map 502. In one or more embodiments, in reference to FIG. 5, the sharp-displacement texture-rendering system 106 utilizes bilinear interpolation to generate the filtered displacement texture 508 with a grayscale color value that is based on the bilinear interpolation of the interpolation evaluation corner points C and D within an area (or segment) associated with the texture sampling point P and discontinuity $c_1$ (from the sharpness map texel 504).

Furthermore, in one or more embodiments and in reference to FIG. 5, the sharp-displacement texture-rendering system 106 samples the displacement map 502 at various texture sampling points to filter the displacement map 502. For example, in reference to FIG. 5, when the texture sampling point is at a position within an area created by the discontinuity $c_1$ the discontinuity $c_2$, the left-side edge, and the top-side edge of the sharpness map texel 504, the sharp-displacement texture-rendering system 106 samples texels of the displacement map 502 selecting a grayscale color value associated with the interpolation evaluation corner point B (of the sharpness map texel 504) to filter from the displacement map 502 at the texture sampling point. Then, the sharp-displacement texture-rendering system 106 filters the identified grayscale color value associated with the interpolation evaluation corner point B within the area (or segment) created by discontinuity $c_1$, the discontinuity $c_2$, the left-side edge, and the top-side edge of the sharpness map texel 504 (e.g., using bilinear interpolation).

Moreover, in some embodiments and in reference to FIG. 5, when the texture sampling point is at a position within an area created by the discontinuity $c_2$, the left-side edge, and the bottom-side edge of the sharpness map texel 504, the sharp-displacement texture-rendering system 106 samples texels of the displacement map 502 selecting a grayscale color value associated with the interpolation evaluation corner point A (of the sharpness map texel 504) to filter from the displacement map 502 at the texture sampling point. In addition, the sharp-displacement texture-rendering system 106 filters the identified grayscale color value associated with the interpolation evaluation corner point B within the area (or region) created by the discontinuity $c_2$, the left-side edge, and the bottom-side edge of the sharpness map texel 504 (e.g., using bilinear interpolation). As shown in FIG. 5, this results in the sharpness map texel 504 accounting for different, discontinuous grayscale color values of a displacement map in different segments of the texel caused by the discontinuity lines.

Indeed, as shown in FIG. 5, the sharp-displacement texture-rendering system 106 filters the displacement map 502 based on feature values sampled using a sharpness map to generate a filtered displacement texture 508. In particular, as illustrated in FIG. 5, the sharp-displacement texture-rendering system 106 generates the filtered displacement texture 508 that preserves sharp features of the displacement map 502. Indeed, as shown in FIG. 5 the sharp-displacement texture-rendering system 106 preserves sharp features by filtering (e.g., via interpolation) from sampled feature values that correspond to the respective segments (or areas) of discontinuity of the sharpness map (e.g., which includes the sharpness map texel 504) within the filtered displacement texture 508.

In one or more embodiments, in reference to FIG. 5, the sharp-displacement texture-rendering system 106 encodes the discontinuity point positions $\alpha_{i,j}$, $\alpha_{i,j+1}$, $\beta_{i,j}$, and $\beta_{i+1,j}$ in accordance with one or more embodiments. In particular, the sharp-displacement texture-rendering system 106 encodes the discontinuity point positions as components of one or more sharpness map texels and retrieves the discontinuity point positions to position the discontinuity points on a corresponding edge of the one or more sharpness map texels.

For instance, the sharp-displacement texture-rendering system 106 retrieves discontinuity point locations $\alpha_{i,j}$ and $\beta_{i,j}$ (from the sharpness map texel 504) and positions the discontinuity points at the bottom-side edge and left-side edge of the sharpness map texel 504 (i, j), respectively. Moreover, in some instances, the sharp-displacement texture-rendering system 106 retrieves a discontinuity point location $\alpha_{i,j+1}$ that references a location on a bottom-side edge of a sharpness map texel (i,j+1) that is adjacent to the top-side edge of the sharpness map texel 504 (i,j). In addition, in some embodiments, the sharp-displacement texture-rendering system 106 retrieves a discontinuity point location that references a location on a left-side edge of a sharpness map texel (i+1, j) that is adjacent to the right-side edge of the sharpness map texel 504 (i,j). Furthermore, as shown in FIG. 5, the sharp-displacement texture-rendering system 106 reconstructs the discontinuity line $c_1$ and discontinuity line $c_2$ based on encoded base discontinuity configurations with bit flags in accordance with one or more embodiments (e.g., in relation to FIG. 4).

Moreover, in one or more embodiments, the sharp-displacement texture-rendering system 106 utilizes various interpolation approaches to filter feature values of a displacement map to generate a displacement map texture. As used herein, the term "interpolation" refers to an approach of generating a feature value (at a given location) from one or more sampled (or evaluated) feature values. In some instances, the sharp-displacement texture-rendering system 106 utilizes various linear interpolation approaches to generate a feature value by identifying a feature value that fits within a curve between sampled (or evaluated) feature values. Indeed, the sharp-displacement texture-rendering system 106 utilizes interpolation approaches such as, but not limited to, bilinear interpolation and/or trilinear interpolation.

As illustrated in FIG. 5, the sharp-displacement texture-rendering system 106 samples a displacement map based on a sharpness map to identify one or more feature values to filter from the displacement map and then filters the feature values identified during sampling to generate a filtered displacement texture. Indeed, in one or more embodiments, as described above, the sharp-displacement texture-rendering system 106 ensures that filtering (or interpolation) of the displacement map does not occur across discontinuities encoded (or defined) in a sharpness map. In order to achieve this within a GPU pipeline in real time, in certain instances, the sharp-displacement texture-rendering system 106 utilizes interpolation coefficients for evaluation samples of the displacement map to indicate whether to utilize a given evaluation sample (e.g., a sample feature value) of the displacement map during filtering. In particular, in one or more embodiments, the sharp-displacement texture-rendering system 106 sets an interpolation coefficient to zero for a given evaluation sample when the given evaluation sample is separated from a texture sampling point by a discontinuity (from the sharpness map).

In addition, upon identifying the interpolation coefficients, the sharp-displacement texture-rendering system 106, in one or more embodiments, normalizes the interpolation coefficients to form a partition of unity. For example, by doing so, the sharp-displacement texture-rendering system 106 identifies one or more evaluation samples having interpolation coefficients of 1 (e.g., indicating to utilize the given evaluation sample in filtering) within different areas (or segments) created by discontinuities of a sharpness map. Indeed, in some embodiments, the sharp-displacement texture-rendering system 106 identifies the evaluation samples to utilize in filtering within an area created by discontinuities of a sharpness map by setting one or more interpolation coefficients for evaluation samples within the area.

Figure 6:
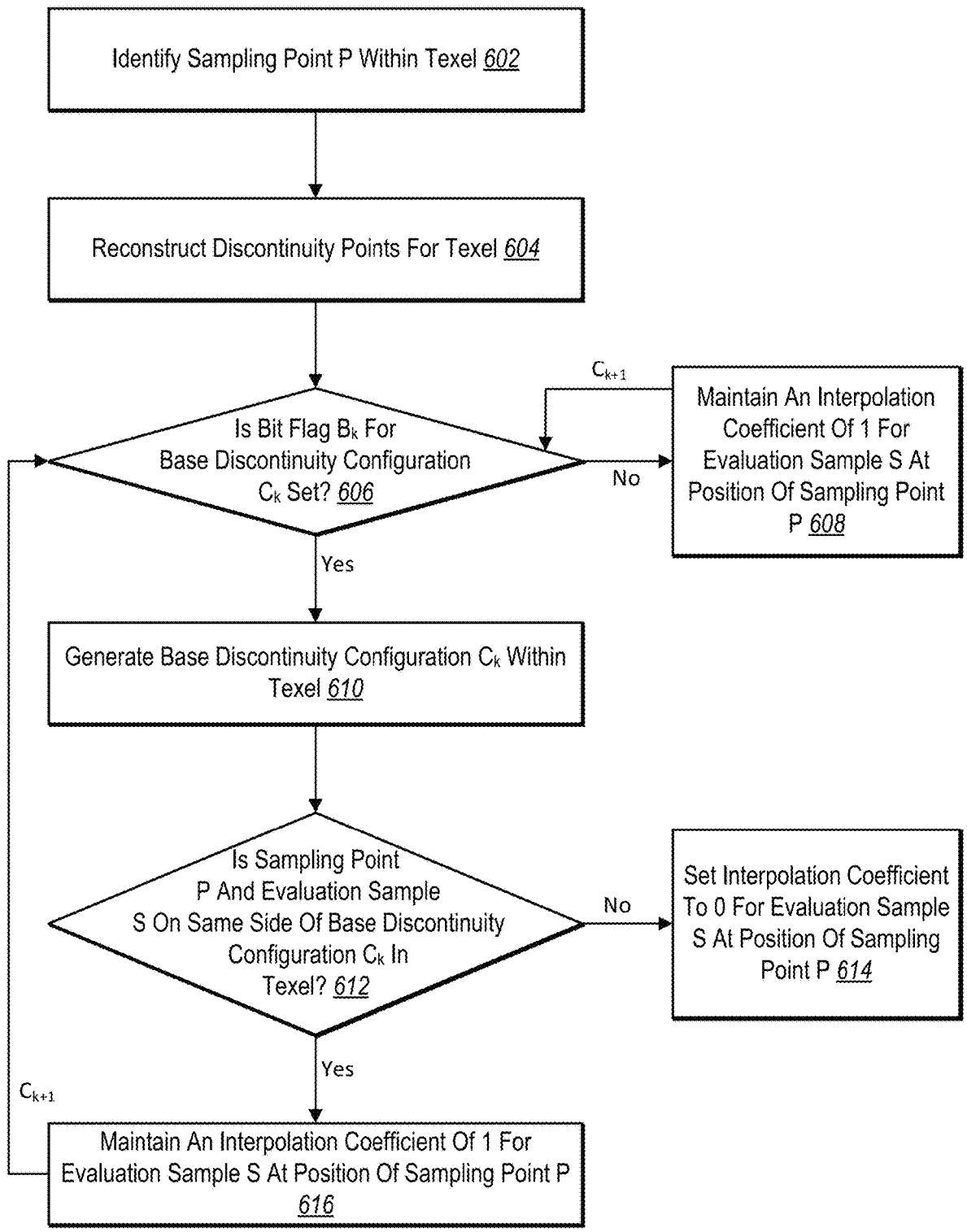
FIG. 6 illustrates a state diagram of a sharp-displacement texture-rendering system utilizing a texture sampling point to set interpolation coefficients based on discontinuities encoded within a sharpness map in accordance with one or more embodiments.

For instance, FIG. 6 illustrates a state diagram of the sharp-displacement texture-rendering system 106 utilizing a texture sampling point to set interpolation coefficients of evaluation samples (e.g., feature values corresponding to evaluation corner points) based on discontinuities encoded within sharpness map texels. For instance, as shown in FIG. 6, the sharp-displacement texture-rendering system 106 identifies a sampling point P (e.g., texture sampling point) within a texel (e.g., a sharpness map texel) in an act 602. In one or more embodiments, the sharp-displacement texture-rendering system 106 identifies texel of the sharpness map that includes the sampling point P by scaling texture coordinates (of the displacement map) by a size of the sharpness map and subtracting a shifted length amount (e.g., half a texel) due to shifting the texels of the sharpness map in relation to the displacement map. In particular, in some embodiments, the sharp-displacement texture-rendering system 106 defines integers of the resulting texture coordinates as the index of the texel that includes the sampling point P and fractional parts of the texture coordinates $(x,y) \in [0,1]$ of the sampling point P within the sharpness map texel.

Furthermore, as shown in FIG. 6, the sharp-displacement texture-rendering system 106 reconstructs discontinuity points for the texel of the sharpness map that includes the sampling point P in an act 602 (in accordance with one or more embodiments). Then, as further shown in FIG. 6, the sharp-displacement texture-rendering system 106 checks each base discontinuity configuration $c_k$ and corresponding bit flag $b_k$ (in the bit mask) encoded within the texel of the sharpness map to determine which discontinuity line to reconstruct. Furthermore, as shown in FIG. 6, the sharp-displacement texture-rendering system 106 determines whether to set an interpolation coefficient to zero for an evaluation sample depending on which side of the discontinuity the evaluation sample is positioned. More specifically, in some embodiments, the sharp-displacement texture-rendering system 106 initially sets an interpolation coefficient to one for an evaluation sample and, then, upon determining that the evaluation sample is not on the same side of a reconstructed (i.e., existing) discontinuity line, the sharp-displacement texture-rendering system 106 sets the interpolation coefficient to zero. By doing so, in one or more embodiments, the sharp-displacement texture-rendering system 106 ensures that only evaluation samples that are not separated from a sampling point by any existing discontinuity line have an interpolation coefficient of one.

To illustrate, as shown in FIG. 6, the sharp-displacement texture-rendering system 106 identifies if a bit flag $b_k$ is set (e.g., to 1) for a base discontinuity configuration $c_k$ (in an act 606). Furthermore, as shown in FIG. 6, when the bit flag $b_k$ is not set, the sharp-displacement texture-rendering system 106 maintains an interpolation coefficient of 1 for an evaluation sample S at a position of the sampling point P (in an act 608). Indeed, in some instances, the sharp-displacement texture-rendering system 106 maintains an interpolation coefficient of 1 by multiplying the interpolation coefficient by 1 (e.g., as shown in the Dirac function below with reference to the interpolation coefficient $\delta_S^k$). Then, as shown in FIG. 6, the sharp-displacement texture-rendering system 106 checks the next base discontinuity configuration $c_{k+1}$.

Furthermore, as shown in FIG. 6, when the bit flag $b_k$ is set (e.g., a discontinuity based on the base discontinuity configuration $c_k$ is present), the sharp-displacement texture-rendering system 106 checks whether the sampling point P and an evaluation sample S are on the same side of the base discontinuity configuration $c_k$ in the sharpness map texel in an act 612. For instance, as shown in FIG. 6, when the sampling point P and the evaluation sample S are on the same side of the base discontinuity configuration $c_k$, the sharp-displacement texture-rendering system 106 maintains an interpolation coefficient of 1 for the evaluation sample S at the position of the sampling point P (in an act 616). As mentioned above, in some embodiments, the sharp-displacement texture-rendering system 106 maintains an interpolation coefficient of 1 by multiplying the interpolation coefficient by 1 (e.g., as shown in the Dirac function below with reference to the interpolation coefficient $\delta_S^k$). Subsequently, as shown in FIG. 6, the sharp-displacement texture-rendering system 106 checks the next base discontinuity configuration $c_{k+1}$.

As also shown in FIG. 6, upon determining that the sampling point P and an evaluation sample S are not on the same side of the base discontinuity configuration $c_k$ in the sharpness map texel (in the act 612), the sharp-displacement texture-rendering system 106 sets an interpolation coefficient to 0 for the evaluation sample S at the position of the sampling point P (in an act 614). In one or more embodiments, the sharp-displacement texture-rendering system 106 sets an interpolation coefficient to 0 by multiplying the interpolation coefficient by 0 (e.g., as shown in the Dirac function below with reference to the interpolation coefficient $\delta_S^k$). For example, by setting the interpolation coefficient to 0 for the evaluation sample S at the position of the sampling point P due to the presence base discontinuity configuration $c_k$, the sharp-displacement texture-rendering system 106 indicates to not account for the evaluation sample S in the area at the position of the sampling point P because of the existence of a discontinuity from the base discontinuity configuration $c_k$. In some embodiments, the sharp-displacement texture-rendering system 106 discontinues to check whether to interpolate based on the evaluation sample S at the position of the sampling point P because the evaluation sample S and the sampling point P are identified as not being on the same side of a discontinuity created by the presence of the base discontinuity configuration $c_k$.

Additionally, in certain instances and in reference to FIG. 6, the sharp-displacement texture-rendering system 106 utilizes a texture sampling point at various positions within each sharpness map texel to set an interpolation coefficient for evaluation samples (e.g., based on feature values of a displacement map that correspond to the interpolation evaluation corner points of the sharpness map texels). Indeed, in some embodiments, the sharp-displacement texture-rendering system 106 utilizes the selected feature values (e.g., the feature values having an interpolation coefficient of 1) at a texture sampling point to filter the displacement map for a filtered displacement texture at the location of the texture sampling point. Furthermore, by determining an interpolation coefficient to set for evaluation samples across various texture sampling point locations based on the positioning of the evaluation samples and the locations of the texture sampling point in reference to discontinuities in the sharpness map texels, in some instances, the sharp-displacement texture-rendering system 106 ensures that filtering (or interpolation) of feature values from the displacement map does not occur across discontinuities encoded (or defined) in a sharpness map.

Moreover, within a GPU pipeline in real time, in some embodiments, the sharp-displacement texture-rendering system 106 utilizes interpolation coefficients for evaluation samples of the displacement map to indicate whether to utilize a given evaluation sample S (e.g., a sample feature value) of the displacement map during filtering based on discontinuities of a sharpness map by using a product of a Dirac function (e.g., as illustrated in FIG. 6). For instance, for a given evaluation sample S and a given base discontinuity configuration $c_k$ with a bit flag $b_k$, the sharp-displacement texture-rendering system 106 determines an interpolation coefficient $\delta_S$ for a given texture sampling point at a position (x,y) by using a product of the following Dirac function:

$$\delta_S(x, y) = \prod_k \delta_S^k(x, y),$$

$$\delta_S^k(x, y) = \begin{cases} 1 & \text{if } b_k = 0 \text{ or } P \text{ and } S \text{ are on the same side of } c_k \\ 0 & \text{otherwise} \end{cases}$$

In some embodiments, by utilizing the above-mentioned approach, the sharp-displacement texture-rendering system 106 does not need to test on which side of a discontinuity each evaluation sample is because the approach depends on the position of the discontinuity $c_k$. In certain instances, by determining an interpolation coefficient $\delta_S^k(x, y)$ in accordance with the above-mentioned function at evaluation samples S across various texture sampling point locations (x,y) based on discontinuities $c_k$ from sharpness map texels, the sharp-displacement texture-rendering system 106 ensures that filtering (or interpolation) of feature values from the displacement map does not occur across discontinuities encoded (or defined) in a sharpness map.

In some instances, the sharp-displacement texture-rendering system 106 utilizes a GPU pipeline to sample a displacement map on a per-vertex basis during a tessellation step. In particular, in one or more embodiments, the sharp-displacement texture-rendering system 106, during rendering in a GPU pipeline to synthesize a 3D object, subdivides each patch (e.g., face) of a (coarse) 3D-object mesh according to a tessellation pattern (e.g., patterns made by creating vertices on a 3D-object mesh to repeat a polygon such as a triangle). Indeed, in some embodiments, the sharp-displacement texture-rendering system 106 reconstructs tessellated pattern vertices from a displacement map by moving the vertices along a normal direction (e.g., a surface normal offset). Accordingly, in some embodiments, the sharp-displacement texture-rendering system 106 is able to achieve adaptive rendering of large scenes composed of highly complex 3D models (in real time) with control over a per patch-basis of polygon density (in the 3D-object mesh) through tessellation.

In one or more embodiments, tessellation is performed by splitting vertices to create new vertices in which the vertices move progressively to form a next level of tessellation (e.g., hardware tessellation). The process of tessellation in some cases (e.g., when tessellating between even and odd numbers of vertices) introduces artifacts that depict an undulating surface for a 3D-object (e.g., swimming artifacts). In many instances, the undulation of the surface of a 3D-object is due to under-sampling of a displacement signal (from a displacement map) when a sampling pattern is constantly changing due to tessellation.

To resolve undulation during sampling of a displacement signal, the sharp-displacement texture-rendering system 106, in some embodiments, utilizes power-of-two levels of tessellation to create new vertices in middle of each previous edge of a 3D-object mesh. In some embodiments, the sharp-displacement texture-rendering system 106 utilizes linear interpolation between a middle of an edge and a final position of a vertex (moved or created from tessellation) to obtain a smooth and continuous transition in a 3D-object mesh. During this multi-scale approach to tessellation, vertices at a given level of tessellation also exist in a higher level of tessellation to reduce (or avoid) undulation on surfaces of rendered 3D-objects. In order to account for the multi-scale aspects of tessellation within a GPU pipeline, the sharp-displacement texture-rendering system 106, in some instances, mipmaps a displacement map (e.g., generates reduced resolution versions of the displacement map) rather than under-sampling an original displacement map with a coarse level of tessellation.

However, oftentimes, mipmapping a displacement map smooths features of the displacement map. As such, in one or more embodiments, the sharp-displacement texture-rendering system 106 mipmaps both the displacement map and a corresponding sharpness map to preserve discontinuities of the displacement map in mipmapped versions of the displacement map. For instance, the sharp-displacement texture-rendering system 106 mipmaps a displacement map by filtering texels of a displacement map into a reduced resolution version of the displacement map (e.g., sampling a displacement map in the middle of four texels to produce two lower resolution texels). In order to prevent the smoothing of features of the displacement map during mipmapping, the sharp-displacement texture-rendering system 106 utilizes a sharpness map (generated for the displacement map in accordance with one or more embodiments) to preserve the sharp features of the displacement map.

In order to preserve discontinuities within mipmapped versions of the displacement map, in one or more embodiments, the sharp-displacement texture-rendering system 106 filters a displacement map to generate a reduced resolution displacement map utilizing a sharpness map in accordance with one or more embodiments (e.g., to account for samples located on the same side of discontinuities in a displacement map). In certain instances, filtering the displacement map by utilizing a sharpness map is optimal when the displacement map and the sharpness map have similar (or the same) resolution (e.g., to avoid having to check multiple texels to determine which evaluation samples are in the same region as texture sampling point).

As such, in one or more embodiments, the sharp-displacement texture-rendering system 106 mipmaps a sharpness map to generate reduced resolution sharpness maps that have similar resolutions to the mipmapped displacement maps. In some cases, a conventional mipmapping approach is not appropriate for the sharpness map as texels of the sharpness map are encoded with base discontinuity configurations with bit flags and discontinuity points that are relative to texel sizes of the sharpness map. Accordingly, in one or more embodiments, the sharp-displacement texture-rendering system 106 generates a mipmapped sharpness map (e.g., a reduced resolution sharpness map) for a mipmapped displacement map (e.g., a reduced resolution displacement map) by identifying one or more partitions within a reduced resolution displacement map and subsequently generating one or more discontinuity lines within the reduced resolution sharpness map based on the identified one or more partitions.

In one or more embodiments, to generate a reduced resolution (e.g., mipmapped) sharpness map for a reduced resolution (e.g., mipmapped) displacement map, the sharp-displacement texture-rendering system 106 first generates a reduced resolution displacement map (at a level l+1) using a displacement map (at a level l) and a sharpness map (at the level l) (in accordance with one or more embodiments). Then, in some embodiments, the sharp-displacement texture-rendering system 106 generates a reduced resolution sharpness map (at a level l+1) by partitioning samples of the reduced resolution displacement map (at a level l+1) using the discontinuities from the sharpness map (at the level l). For example, the sharp-displacement texture-rendering system 106 determines a configuration for discontinuities in the reduced resolution sharpness map (at a level l+1) that respects the identified at the reduced resolution displacement map (at a level l+1).

In some instances, the sharp-displacement texture-rendering system 106 removes discontinuities from the reduced resolution sharpness map (at a level l+1) that separate samples (from texels) having similar values in the reduced resolution displacement map (at a level l+1). Furthermore, in one or more embodiments, this process is repeated until a desired mip level (l+n) is reached. Indeed, in certain instances, the sharp-displacement texture-rendering system 106 generates displacement maps and sharpness maps at varying mip levels (l+n) to generate a set of mipmapped displacement maps and sharpness maps.

To illustrate the above-mentioned approach, the sharp-displacement texture-rendering system 106 generates a reduced resolution (e.g., mipmapped) displacement map by filtering one or more identified feature values during sampling of a displacement map using a sharpness map (e.g., in accordance with one or more embodiments). Then, in certain instances, the sharp-displacement texture-rendering system 106 identifies interpolation evaluation corner point positions at the center points of texels of the reduced resolution displacement map. To generate a reduced resolution (e.g., mipmapped) sharpness map for the reduced resolution displacement map, in one or more embodiments, the sharp-displacement texture-rendering system 106 identifies one or more partitions within the reduced resolution displacement map by utilizing discontinuity lines from the sharpness map (e.g., the higher resolution sharpness map) and the newly identified interpolation evaluation corner point positions at the center points of texels of the reduced resolution displacement map. Subsequently, the sharp-displacement texture-rendering system 106 generates (or encodes) discontinuity lines for texels of the reduced resolution sharpness map using the identified partitions of the reduced resolution displacement map.

Figure 7:
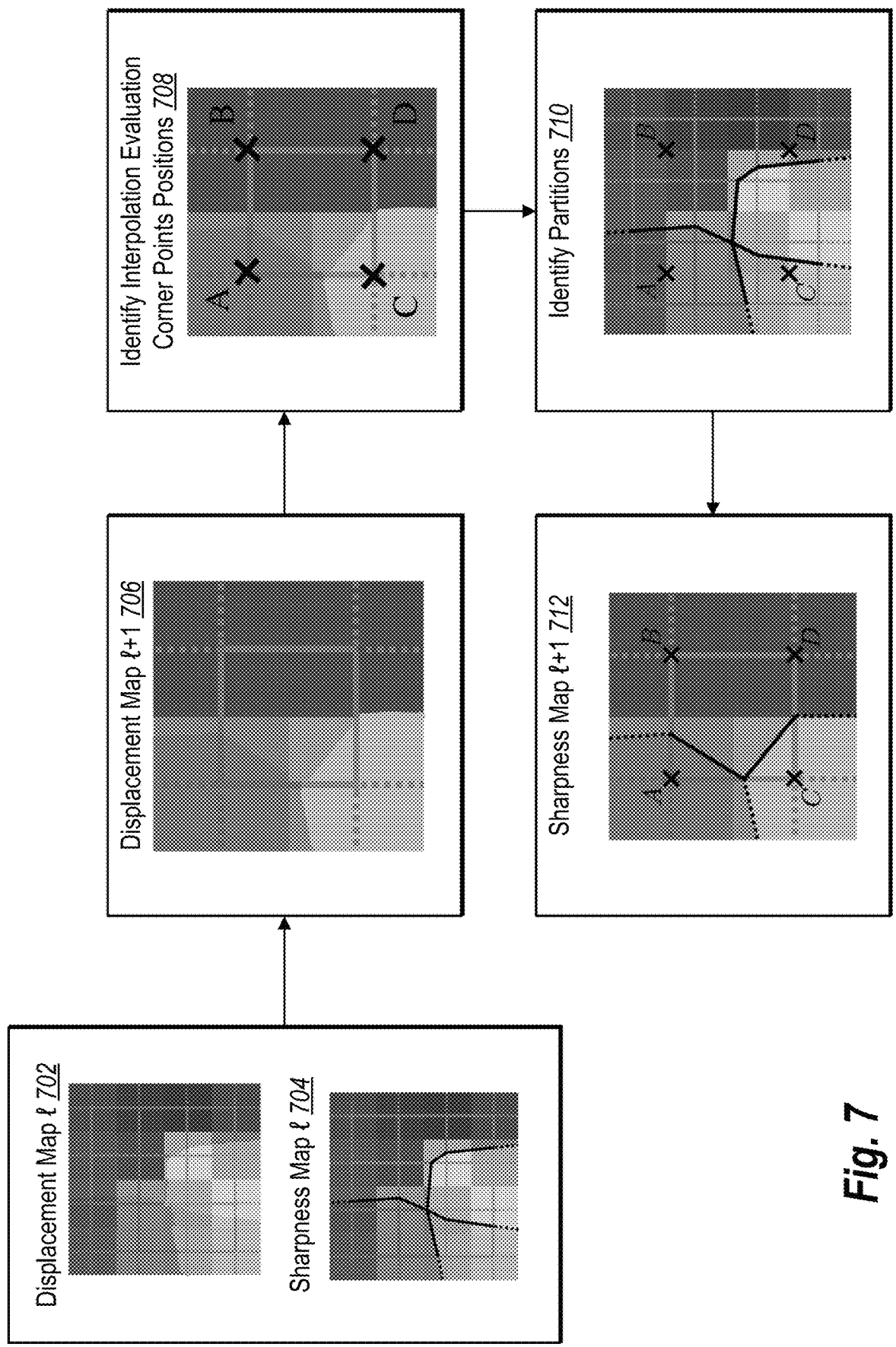
FIG. 7 illustrates a sharp-displacement texture-rendering system generating a reduced resolution sharpness map for a reduced resolution displacement map in accordance with one or more embodiments.

Indeed, FIG. 7 illustrates the sharp-displacement texture-rendering system 106 generating a reduced resolution (e.g., mipmapped) sharpness map for a reduced resolution (e.g., mipmapped) displacement map. As shown in FIG. 7, the sharp-displacement texture-rendering system 106 identifies a displacement map 702 (at a level l) and a corresponding sharpness map 704 (at the level l). Then, as illustrated in FIG. 7, the sharp-displacement texture-rendering system 106 filters the displacement map 702 utilizing the sharpness map 704 (in accordance with one or more embodiments) to generate a reduced resolution displacement map 706 (at a level l+1). Indeed, as shown in FIG. 7, the reduced resolution displacement map 706 includes a texel per four texels of the displacement map 702.

Furthermore, as shown in FIG. 7, the sharp-displacement texture-rendering system 106 identifies interpolation evaluation corner point positions within the reduced resolution displacement map 706 in an act 708. As illustrated in FIG. 7, the sharp-displacement texture-rendering system 106 identifies the interpolation evaluation corner point positions at center points of texels of within the reduced resolution displacement map 706. Additionally, as illustrated in FIG. 7, the sharp-displacement texture-rendering system 106 identifies partitions (in an act 710) for the reduced resolution displacement map 706 by grouping regions within the displacement map using the sharpness map 704 (at a level l) with respect to the positions of the interpolation evaluation corner point positions at center points of texels of within the reduced resolution displacement map 706.

In order to identify the partitions in the act 710, the sharp-displacement texture-rendering system 106 partitions texels of the displacement map 702 (at the level l) by grouping together the texels if they belong to same region according to positions of the interpolation evaluation corner point from the reduced resolution displacement map 706 (at the level l+1) in relation to the discontinuities of the sharpness map 704 (at the level l). The identified partitions from the discontinuities of the sharpness map 704 (at the level l) are then utilized to determine partitions within the reduced resolution displacement map 706 (at the level l+1).

For instance, in some embodiments, as shown in FIG. 7, the sharp-displacement texture-rendering system 106 identifies discontinuity points along edges of texels that align with the positions of the interpolation evaluation corner point from the reduced resolution displacement map 706 (at the level l+1) in the act 710. In one or more embodiments, the sharp-displacement texture-rendering system 106 positions discontinuity points at an averaged location between all intersections of discontinuities from the sharpness map 704 (at the level l) on an edge created between positions of the interpolation evaluation corner points from the reduced resolution displacement map 706 (at the level l+1). As illustrated in FIG. 7, the edges created between positions of the interpolation evaluation corner point from the reduced resolution displacement map 706 (at the level l+1) correspond to texel edges of a reduced resolution sharpness map 712 (at the level l+1).

To illustrate, in reference to FIG. 7, the sharp-displacement texture-rendering system 106 identifies a texel edge for the reduced resolution sharpness map (at the level l+1) by utilizing an edge between positions of the interpolation evaluation corner points C and D from the reduced resolution displacement map 706 (at the level l+1) (in the act 710). Then, the sharp-displacement texture-rendering system 106 (in the act 710) identifies intersections of discontinuities from the sharpness map 704 (at the level l) on an edge created between positions of the interpolation evaluation corner points C and D. Moreover, as shown in FIG. 7, the sharp-displacement texture-rendering system 106 utilizes an averaged location of the intersections (from the sharpness map 704 (at the level l)) to generate a discontinuity point along the edge created between positions of the interpolation evaluation corner points C and D (for the reduced resolution sharpness map 712 (at the level l+1)). By doing so, as shown in FIG. 7, the sharp-displacement texture-rendering system 106 merges discontinuities representing features that are below a single texel length of a texel of the reduced resolution sharpness map 712 (at the level l+1).

Subsequently, as shown in FIG. 7, upon identifying discontinuity points along edges of texels that align with the positions of the interpolation evaluation corner point from the reduced resolution displacement map 706 (at the level l+1), the sharp-displacement texture-rendering system 106 determines discontinuity configurations between the identified discontinuity points to generate the reduced resolution sharpness map 712 (at the level l+1). In particular, as shown in FIG. 7, the sharp-displacement texture-rendering system 106 determines discontinuity configurations between the identified discontinuity points to generate the reduced resolution sharpness map 712 (at the level l+1) that respect the partitions identified in the act 710. Accordingly, as illustrated in FIG. 7, the sharp-displacement texture-rendering system 106 generates the reduced resolution sharpness map 712 (at the level l+1) having discontinuities for the reduced resolution displacement map 706 (at the level l+1).

In some embodiments, the sharp-displacement texture-rendering system 106 removes discontinuities from a reduced resolution sharpness map (at a level l+1) when a discontinuity is identified as separating samples having feature values that are determined to be similar compared to a threshold similarity. For example, the sharp-displacement texture-rendering system 106 samples one or more texels from a reduced resolution displacement map on each side of discontinuities of a reduced resolution sharpness map. Subsequently, in certain instances, the sharp-displacement texture-rendering system 106 compares the one or more texels on opposing sides of a discontinuity to determine whether the texels are similar in value (e.g., in grayscale color values and/or in a height value). For example, the sharp-displacement texture-rendering system 106 determines a similarity distance (e.g., Euclidian distances, CIELAB Delta E 2000 function) between feature values of the texels and compares the distances to a threshold similarity distance. If the one or more texels on opposing sides of a discontinuity have a similarity distance that satisfies (e.g., is less than or equal to) the threshold similarity distance, the sharp-displacement texture-rendering system 106, in some embodiments, removes the discontinuity from the reduced resolution sharpness map (at a level l+1).

Additionally, in one or more embodiments, the sharp-displacement texture-rendering system 106 selects a mip level according to a determined tessellation level to select from the set of mipmapped displacement maps and sharpness maps. In particular, in certain instances, the sharp-displacement texture-rendering system 106 determines a tessellation level within a GPU pipeline (e.g., a tessellation control shader). Then, in certain embodiments, the sharp-displacement texture-rendering system 106 determines a mip level that corresponds to a displacement map and sharpness map that results in a sampling rate that samples every texel of a displacement map and also results in the sampling of a different texel at each vertex of the tessellation level. However, in most GPU pipelines, a sampling pattern of a tessellator unit is non-configurable.

Accordingly, to achieve the desired sampling rate, in some instances, the sharp-displacement texture-rendering system 106 identifies a mip level for the displacement maps and sharpness maps in which the edges (of the tessellation vertices) are (on average) one-texel length (of the displacement map and sharpness map). In some embodiments, the sharp-displacement texture-rendering system 106 identifies a mip level that limits the edges (of the tessellation vertices) to at most one-texel length (of the displacement map and sharpness map). By doing so, in some embodiments, the sharp-displacement texture-rendering system 106 ensures that edges (of the tessellation vertices) cross at most three texels (of the displacement map and sharpness map).

For example, the sharp-displacement texture-rendering system 106 identifies a mip level (e.g., the highest mip level) which ensures that edges (of the tessellation vertices) are at most one-texel length (of the displacement map and sharpness map). In some embodiments, the sharp-displacement texture-rendering system 106 identifies a selected tessellation level $l_t$. Then, in one or more embodiments, the sharp-displacement texture-rendering system 106 determines an upper bound for the edge size $e_{size}$ from the tessellation level $l_t$ (and a uv-coordinate of a patch corner). In some cases, when a tessellator utilizes a triangular pattern, the sharp-displacement texture-rendering system 106 identifies an upper bound for the edge size $e_{size}$ by identifying medians of triangles that are subdivided an $l_t$ number of times. In some instances, the sharp-displacement texture-rendering system 106 identifies a median of the triangles by subdividing $l_t/2$ times on each side of a triangle centroid. For example, the sharp-displacement texture-rendering system 106 determines an upper bound for the edge size $e_{size}$ based on an upper bound of a median triangle length $m_{size}$ for the tessellation level $l_t$ by utilizing the following equation:

$$e_{size} = \frac{4 * m_{size}}{3 * l_t}.$$

Then, in some embodiments, the sharp-displacement texture-rendering system 106 utilizes the upper bound for the edge size $e_{size}$ to identify a mip level (e.g., the highest mip level) which ensures that edges (of the tessellation vertices) are at most one-texel length (of the displacement map and sharpness map). In particular, the sharp-displacement texture-rendering system 106 scales the upper bound for the edge size $e_{size}$ by a texture size to determine a mip level. For instance, the sharp-displacement texture-rendering system 106 determines a mip level τ based on the upper bound for the edge size $e_{size}$ and a texture size $t_{size}$ by utilizing the following equation:

$$\tau = \log_2(t_{size} * e_{size}).$$

Moreover, the sharp-displacement texture-rendering system 106 utilizes the mip level T to identify a displacement map and sharpness map from a set of mipmapped displacement maps and sharpness maps.

In one or more embodiments, the sharp-displacement texture-rendering system 106 sets a different tessellation level for different (adjacent) patches (of a 3D-object mesh). Furthermore, in such cases, the sharp-displacement texture-rendering system 106 utilizes a matching tessellation level (and matching mip level) on a shared border of the different (adjacent) patches. By doing so, the sharp-displacement texture-rendering system 106 removes the appearance of cracks along the borders of different patches due to duplicated vertices along the border sampling different values. Accordingly, in one or more embodiments, the sharp-displacement texture-rendering system 106 sets a different tessellation level for an inner patch and an outer patch. Indeed, in some instances, when utilizing triangular patches, the sharp-displacement texture-rendering system 106 sets an inner patch tessellation level and three outer tessellation levels corresponding to each border of the inner patch.

Furthermore, the sharp-displacement texture-rendering system 106 provides a mip level selection for the inner patch and the bordering outer patches. In one or more embodiments, the sharp-displacement texture-rendering system 106 utilizes a mip level determined by the above-mentioned approach based on the upper bound of a median triangle length $m_{size}$. For the bordering outer patches, the sharp-displacement texture-rendering system 106 determines a mip level by defining an upper bound for an edge size $e_{size}$ of the outer patch border as the length of the outer patch border divided by a tessellation level selected for the outer patch. For instance, the sharp-displacement texture-rendering system 106 determines the mip levels and, then identifies a displacement map and sharpness map from a set of mipmapped displacement maps and sharpness maps for the inner and outer patches.

Additionally, in some embodiments, the sharp-displacement texture-rendering system 106 samples and filters the displacement map in accordance with the one or more embodiments to generate a filtered displacement texture for a 3D-object mesh within a GPU pipeline. In addition, the sharp-displacement texture-rendering system 106 utilizes the filtered displacement texture and the 3D-object mesh to generate, for display within a graphical user interface, a 3D object. For example, FIG. 8 illustrates the sharp-displacement texture-rendering system 106 utilizing a GPU pipeline to generate a 3D object by utilizing a filtered displacement texture and the 3D-object mesh.

Figure 8:
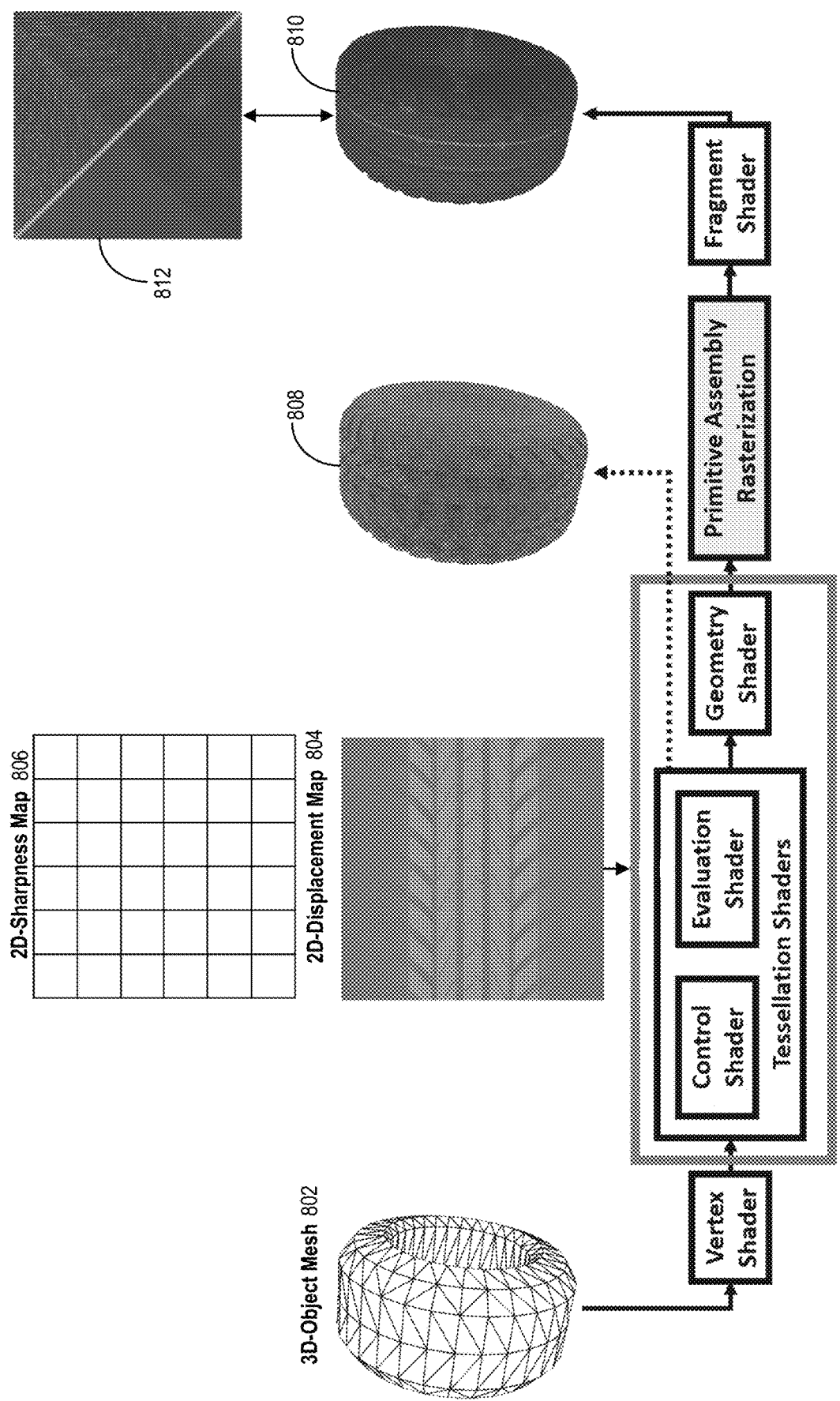
FIG. 8 illustrates utilizing a GPU pipeline to generate a 3D object by utilizing a filtered displacement texture in accordance with one or more embodiments.

As shown in FIG. 8, the sharp-displacement texture-rendering system 106 provides a 3D-object mesh 802, a 2D-displacement map 804, and a 2D-sharpness map 806 to GPU pipeline that includes a vertex shader, tessellation shaders, and geometry shaders. Indeed, the sharp-displacement texture-rendering system 106 utilizes the 2D-sharpness map 806 to sample and filter the 2D-displacement map 804 to generate a 2D-displacement texture for the 3D-object mesh 802 (in accordance with one or more embodiments). Furthermore, the sharp-displacement texture-rendering system 106 utilizes the control shader of the tessellation shaders to set up a level of tessellation for each patch (or face) of the 3D-object mesh 802. Although FIG. 8 illustrates one type of GPU pipeline, in some embodiments, the sharp-displacement texture-rendering system 106 can utilize a variety of GPU pipelines such as, but not limited to, a GPU pipeline that utilizes mesh shaders, a GPU pipeline that utilizes compute shaders or non-graphical GPU computing (e.g., CUDA, OpenCL), and/or a GPU pipeline that emulates a hardware tessellator unit using instanced tessellation.

A 3D-object mesh (sometimes referred to as a "polygonal mesh") refers to a representation of one or more vertices, edges, and faces that define a shape of a 3D-object. For instance, a 3D-object mesh includes a set of vertices in a 3D space that are connected to form edges and faces that define a shape of a 3D-object. In one or more embodiments, the 3D-object mesh includes triangular polygons that form a shape of a 3D-object. Furthermore, in some instances, the sharp-displacement texture-rendering system applies textures to the faces formed by vertices and edges of a 3D-object mesh to provide visual attributes to the surfaces (of the faces) of the 3D-object mesh. In some instances, the sharp-displacement texture-rendering system tessellates a 3D-object mesh by applying (or adding) various vertices within the 3D-object mesh to increase a number of polygons (e.g., triangular polygons) that form a shape of a 3D-object. In some embodiments, a 3D-object mesh is generated by applying tessellation on a coarse mesh (e.g., sometimes referred to as a "base mesh" or a "control mesh").

The sharp-displacement texture-rendering system 106 utilizes the evaluation shader of the tessellation shaders to displace generated vertices of the 3D-object mesh according to the filtered 2D-displacement texture. As shown in FIG. 8, the tessellation shaders result in a displaced 3D-object mesh 808 with displaced vertices according to the filtered displacement texture. Furthermore, as illustrated in FIG. 8, the sharp-displacement texture-rendering system 106 utilizes a geometry shader, primitive assembly rasterization, and a fragment shader to render a 3D object 810 that includes properties of the displaced 3D-object mesh 808 and one or more other properties (e.g., color textures, Bidirectional Reflectance Distribution Function textures). Although FIG. 8 illustrates specific components of a GPU pipeline, the sharp-displacement texture-rendering system 106 utilizes various combination of the illustrated components and additional components within a GPU pipeline to render a 3D object from a filtered displacement texture in accordance with one or more embodiments.

As shown in FIG. 8, the sharp-displacement texture-rendering system 106 utilizes a filtered displacement texture that preserves discontinuities of a displacement map by utilizing a sharpness map with a 3D-object mesh to generate a 3D object that depicts surfaces (e.g., surface offsets) based on grayscale color values of a filtered displacement texture. For instance, as illustrated in FIG. 8, the rendered 3D object 810 depicts sharp displacement features 812 based on the filtered displacement texture. Indeed, in one or more embodiments, the sharp-displacement texture-rendering system 106 provides the generated 3D object 810 for display within graphical user interface of a client device. Indeed, in some embodiments, the sharp-displacement texture-rendering system 106 renders and displays various numbers of 3D objects within a 3D scene that preserve sharp displacement feature through the use of sharpness maps (in accordance with one or more embodiments).

Figure 9:
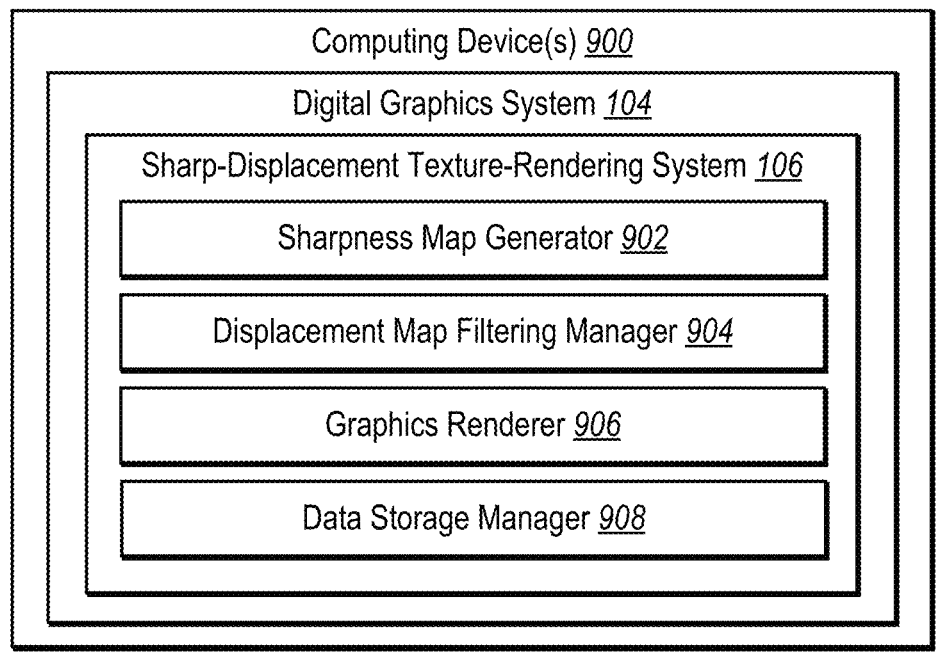
FIG. 9 illustrates a schematic diagram of a sharp-displacement texture-rendering system in accordance with one or more embodiments.

Turning now to FIG. 9, additional detail will be provided regarding components and capabilities of one or more embodiments of the sharp-displacement texture-rendering system. In particular, FIG. 9 illustrates an embodiment of an example sharp-displacement texture-rendering system 106 executed by a computing device 900 (e.g., the server device(s) 102). As shown by the embodiment of FIG. 9, the computing device 900 includes or hosts the digital graphics system 104 and the sharp-displacement texture-rendering system 106. Furthermore, as shown in FIG. 9, the sharp-displacement texture-rendering system 106 includes a sharpness map generator 902, a displacement map filtering manager 904, a graphics renderer 906, and a data storage manager 908.

As just mentioned, and as illustrated in the embodiment of FIG. 9, the sharp-displacement texture-rendering system 106 includes the sharpness map generator 902. For instance, the sharpness map generator 902 encodes texels with one or more discontinuity points and discontinuity base configurations to reconstruct discontinuities for a displacement map as described above (e.g., in relation to FIGS. 3 and 4). Moreover, in some embodiments, the sharpness map generator 902 utilizes user selections of discontinuity lines and/or discontinuity lines detected by a digital contour detector for a displacement map to encode discontinuities within a sharpness map as described above (e.g., in relation to FIGS. 3 and 4). Additionally, in one or more embodiments, the sharpness map generator 902 generates reduced resolution (e.g., mipmapped) sharpness maps as described above (e.g., in relation to FIG. 7).

Furthermore, as shown in FIG. 9, the sharp-displacement texture-rendering system 106 includes the displacement map filtering manager 904. For example, the displacement map filtering manager 904 samples one or more feature values of a displacement map by referencing one or more discontinuities of a sharpness map as described above (e.g., in relation to FIGS. 5 and 6). In addition, in one or more embodiments, the displacement map filtering manager 904 filters (e.g., via bilinear interpolation) the one or more sampled feature values with a region defined by a sharpness map discontinuity to preserve sharp features of the displacement map as described above (e.g., in relation to FIGS. 5 and 6).

As also illustrated in FIG. 9, the sharp-displacement texture-rendering system 106 includes the graphics renderer 906. In one or more embodiments, the graphics renderer 906 utilizes a sharpness map, a displacement map, and a 3D-object mesh with one or more components of a GPU pipeline to generate a filtered displacement texture as described above (e.g., in relation to FIGS. 5-6 and 8). Furthermore, in some embodiments, the graphics renderer 906 generates a 3D object having surface normal offsets (e.g., a displaced surface) corresponding to sharp feature displacements of a filtered displacement texture as described above (e.g., in relation to FIGS. 5-6 and 8). Indeed, in one or more embodiments, the graphics renderer 906 provides for displays within a graphical user interface of a client device, a rendered 3D object as described above (e.g., in relation to FIG. 8).

Furthermore, as shown in FIG. 9, the sharp-displacement texture-rendering system 106 includes the data storage manager 908. In some embodiments, the data storage manager 908 is implemented by one or more memory devices. Moreover, in some embodiments, the data storage manager 908 maintains data to perform one or more functions of the sharp-displacement texture-rendering system 106. For instance, the data storage manager 908 includes 3D-object mesh data (e.g., vertices, edges, polygonal faces), displacement maps (texel data, feature value data), sharpness maps (e.g., base discontinuity configurations, discontinuity points, texel data), GPU pipeline data (e.g., tessellation shader data, geometry shader data, vertex shader data, rasterization data, fragment shader data), digital contour detection data, and graphical user interface data (e.g., user input tools, displacement map display data).

Each of the components 902-908 of the computing device 900 (e.g., the computing device 900 implementing the sharp-displacement texture-rendering system 106), as shown in FIG. 9, may be in communication with one another using any suitable technology. The components 902-908 of the computing device 900 can comprise software, hardware, or both. For example, the components 902-908 can comprise one or more instructions stored on a computer-readable storage medium and executable by processor of one or more computing devices. When executed by the one or more processors, the computer-executable instructions of the sharp-displacement texture-rendering system 106 (e.g., via the computing device 900) can cause a client device and/or server device to perform the methods described herein. Alternatively, the components 902-908 and their corresponding elements can comprise hardware, such as a special purpose processing device to perform a certain function or group of functions. Additionally, the components 902-908 can comprise a combination of computer-executable instructions and hardware.

Furthermore, the components 902-908 of the sharp-displacement texture-rendering system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-908 may be implemented as a stand-alone application, such as a desktop or mobile application. Furthermore, the components 902-908 may be implemented as one or more web-based applications hosted on a remote server. The components 902-908 may also be implemented in a suite of mobile device applications or "apps." To illustrate, the components 902-908 may be implemented in an application, including but not limited to, ADOBE PHOTO SHOP, ADOBE PREMIERE, ADOBE LIGHTROOM, ADOBE ILLUSTRATOR, ADOBE SUBSTANCE, ADOBE SUBSTANCE PAINTER, ADOBE SUBSTANCE DESIGNER, ADOBE SUBSTANCE ALCHEMIST, AND/OR ADOBE MEDIUM. "ADOBE," "ADOBE PHOTOSHOP," "ADOBE PREMIERE," "ADOBE LIGHTROOM," "ADOBE ILLUSTRATOR," "ADOBE SUBSTANCE," "ADOBE SUBSTANCE PAINTER," "ADOBE SUBSTANCE DESIGNER," "ADOBE SUBSTANCE ALCHEMIST," AND/OR "ADOBE MEDIUM" are either registered trademarks or trademarks of Adobe Inc. in the United States and/or other countries.

Figure 10:
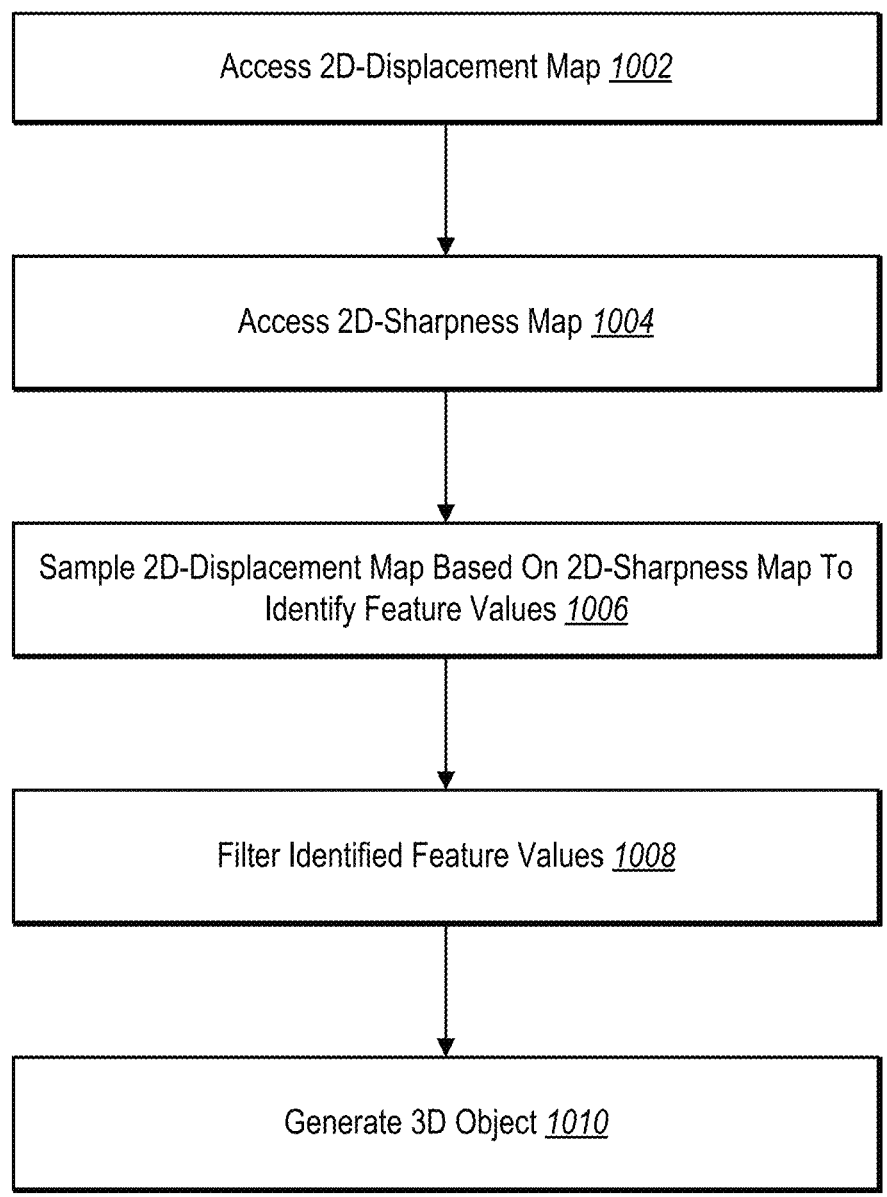
FIG. 10 illustrates a flowchart of a series of acts for filtering a displacement map based on discontinuities identified in a sharpness map in accordance with one or more embodiments.
Figure 11:
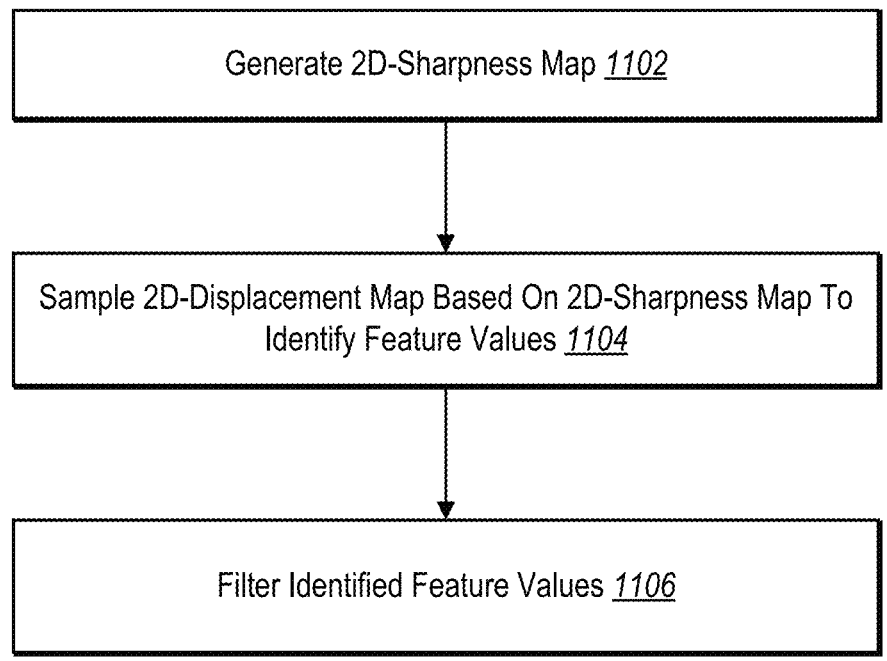
FIG. 11 illustrates a flowchart of a series of acts for generating a sharpness map that preserves discontinuities of a displacement map during filtering of the displacement map in accordance with one or more embodiments.

FIGS. 1-9, the corresponding text, and the examples provide a number of different methods, systems, devices, and non-transitory computer-readable media of the sharp-displacement texture-rendering system 106. In addition to the foregoing, one or more embodiments can also be described in terms of flowcharts comprising acts for accomplishing a particular result, as shown in FIGS. 10 and 11. The acts shown in FIGS. 10 and 11 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIGS. 10 and 11. In some embodiments, a system can be configured to perform the acts of FIGS. 10 and 11. Alternatively, the acts of FIGS. 10 and 11 can be performed as part of a computer-implemented method.

As mentioned above, FIG. 10 illustrates a flowchart of a series of acts 1000 for filtering a displacement map based on discontinuities identified in a sharpness map in accordance with one or more embodiments. While FIG. 10 illustrates acts according to one embodiment, alternative embodiments may omit, add to, reorder, and/or modify any of the acts shown in FIG. 10.

As shown in FIG. 10, the series of acts 1000 include an act 1002 of accessing a 2D-displacement map. For instance, the act 1002 includes accessing a 2D-displacement map that includes feature values corresponding to surface normal offsets for a 3D-object mesh. As further shown in FIG. 10, the series of acts 1000 include an act 1004 of accessing a 2D-sharpness map. In some embodiments, the act 1004 includes accessing a 2D-sharpness map that includes at least one texel encoded with one or more discontinuity lines corresponding to feature values of a 2D-displacement map.

Furthermore, in some instances, the act 1004 includes accessing a 2D-sharpness map that includes at least one texel encoded with one or more discontinuity points and a set of base discontinuity configurations having bit flags. For example, a bit flag indicates whether to generate one or more discontinuity lines between one or more discontinuity points utilizing a given base discontinuity configuration from a set of base discontinuity configurations. Additionally, in one or more embodiments, the act 1004 includes accessing a 2D-sharpness map that includes at one texel encoded with a discontinuity point on an edge of at least one texel. Furthermore, in one or more embodiments, the act 1004 includes generating a 2D-sharpness map based on user selections of one or more discontinuity lines. Moreover, in some embodiments, the act 1004 includes generating a 2D-sharpness map by detecting one or more discontinuity lines in a 2D-displacement map utilizing a digital contour detector.

In addition, in certain instances, the act 1004 includes generating a reduced resolution 2D-displacement map by filtering one or more identified feature values based on a 2D-sharpness map. Furthermore, in some embodiments, the act 1004 includes identifying interpolation evaluation corner point positions within a reduced resolution 2D-displacement map at center points of one or more texels of the reduced resolution 2D-displacement map. In certain embodiments, the act 1004 includes generating a reduced resolution 2D-sharpness map for the reduced resolution 2D-displacement map by identifying one or more partitions within a reduced resolution 2D-displacement map based on one or more discontinuity lines of a 2D-sharpness map and interpolation evaluation corner point positions in relation to the 2D-sharpness map. Moreover, in some instances, the act 1004 includes generating one or more discontinuity lines for at least one texel of a reduced resolution 2D-sharpness map based on identified one or more partitions and interpolation evaluation corner point positions within a reduced resolution 2D-displacement map.

As shown in FIG. 10, the series of acts 1000 include an act 1006 of sampling a 2D-displacement map based on a 2D-sharpness map to identify feature values. In particular, in certain instances, the act 1006 includes sampling a 2D-displacement map based on a 2D-sharpness map to identify one or more feature values to filter. For example, the act 1006 includes sampling a 2D-displacement map based on a 2D-sharpness map to identify one or more feature points to filter by mapping the 2D-sharpness map in relation to the 2D-displacement map, identifying a position of a texture sampling point within the 2D-displacement map, and selecting, from the 2D-displacement map, the one or more feature values positioned on a same side of one or more discontinuity lines of at least one texel of the 2D-sharpness map as the position of the texture sampling point.

In addition, in some embodiments, the act 1006 includes sampling a 2D-displacement map based on a 2D-sharpness map by identifying that a position of a texture sampling point and one or more interpolation evaluation corner points of at least one texel are positioned within an area created by one or more discontinuity lines and one or more edges of at least one texel of the 2D-sharpness map and selecting the identified one or more feature values of the 2D-displacement map from one or more interpolation evaluation corner points positioned within the area. Moreover, in one or more embodiments, the act 1006 includes mapping 2D-sharpness map in relation to a 2D-displacement map by shifting positional values of texels of a 2D-sharpness map to associate interpolation evaluation corner points of texels with feature values of the 2D-displacement map.

As shown in FIG. 10, the series of acts 1000 include an act 1008 of filtering identified feature values. In particular, in one or more embodiments, the act 1008 includes filtering one or more identified feature values (from sampling a 2D-displacement map based on a 2D-sharpness map) to generate a filtered 2D-displacement texture. For example, the act 1008 includes filtering one or more identified (from sampling a 2D-displacement map based on a 2D-sharpness map) feature values within an area created by one or more discontinuity lines and one or more edges of at least one texel of the 2D-sharpness map to generate a filtered 2D-displacement texture. For instance, the act 1008 includes filtering one or more identified (from sampling a 2D-displacement map based on a 2D-sharpness map) feature values utilizing bilinear interpolation. As further shown in FIG. 10, the series of acts 1000 include an act 1010 of generating a 3D object. For instance, the act 1010 includes generating, for display within a graphical user interface, a 3D object utilizing a filtered 2D-displacement texture and a 3D-object mesh.

As mentioned above, FIG. 11 illustrates a flowchart of a series of acts 1100 for generating a sharpness map that preserves discontinuities of a displacement map during filtering of the displacement map in accordance with one or more embodiments. While FIG. 11 illustrates acts according to one embodiment, alternative embodiments may omit, add to, reorder, and/or modify any of the acts shown in FIG. 11.

As shown in FIG. 11, the series of acts 1100 includes an act 1102 of generating a 2D-sharpness map. For example, the act 1102 includes generating a 2D-sharpness map that includes at least one texel encoded with one or more discontinuity lines corresponding to one or more discontinuities of a 2D-displacement map. For instance, a 2D-displacement map includes feature values corresponding to surface normal offsets for a 3D-object mesh. In some embodiments, the act 1102 includes generating a 2D-sharpness map that includes a first discontinuity point on a first edge of at least one texel and a second discontinuity point on a second edge of the at least one texel. Moreover, in some embodiments, the act 1102 includes generating a 2D-sharpness map by encoding at least one texel with at least one base discontinuity configuration indicating to generate a discontinuity line between a first discontinuity point and a second discontinuity point.

For instance, a 2D-sharpness map includes a first discontinuity point on a first edge of at least one texel and a second discontinuity point on a second edge of the at least one texel. In addition, in certain instances, the act 1102 includes generating a 2D-sharpness map by encoding at least one texel with at least one base discontinuity configuration indicating to generate a discontinuity line between a first discontinuity point and a second discontinuity point.

Furthermore, in one or more embodiments, the act 1102 includes generating a 2D-sharpness map by receiving a user selection of a discontinuity line in relation to a displayed 2D-displacement map, identifying one or more discontinuity points and a base discontinuity configuration corresponding to a discontinuity line in relation to at least one texel of the 2D-sharpness map, and encoding the at least one texel with the one or more discontinuity points and the base discontinuity configuration. Additionally, in some embodiments, the act 1102 includes generating a 2D-sharpness map by utilizing a digital contour detector to detect a discontinuity line in a 2D-displacement map along differing feature values, identifying one or more discontinuity points and a base discontinuity configuration corresponding to a discontinuity line in relation to at least one texel of the 2D-sharpness map, and encoding the at least one texel with the one or more discontinuity points and the base discontinuity configuration.

As shown in FIG. 11, the series of acts 1100 includes an act 1104 of sampling a 2D-displacement map based on a 2D-sharpness map to identify feature values. For instance, the act 1104 includes sampling a 2D-displacement map based on a 2D-sharpness map to identify one or more feature values to filter by mapping the 2D-sharpness map in relation to the 2D-displacement map, identifying a position of a texture sampling point within the 2D-displacement map, and selecting, from the 2D-displacement map, one or more feature values positioned on a same side of one or more discontinuity lines of at least one texel of the 2D-sharpness map as the position of the texture sampling point. Moreover, in some instances, the act 1104 includes sampling a 2D-displacement map based on a 2D-sharpness map by identifying that a position of the texture sampling point and one or more interpolation evaluation corner points of at least one texel (of the 2D-sharpness map) are positioned within an area created by one or more discontinuity lines and one or more edges of the at least one texel and selecting one or more identified feature values of the 2D-displacement map from one or more interpolation evaluation corner points positioned within the area.

As shown in FIG. 11, the series of acts 1100 includes an act 1106 of filtering identified feature values. For example, the act 1106 includes filtering one or more identified feature values to generate a filtered 2D-displacement texture. In some embodiments, the act 1106 includes utilizing bilinear interpolation to filter one or more identified feature values within an area created by one or more discontinuity lines and one or more edges of at least one texel of a 2D-sharpness map to generate a filtered 2D-displacement texture.

Furthermore, in some embodiments, the act 1106 includes generating, for display within a graphical user interface, a 3D object utilizing a filtered 2D-displacement texture and a 3D-object mesh. For instance, a 3D object depicts surfaces based on surface normal offsets corresponding to a filtered 2D-displacement texture. In one or more embodiments, a filtered 2D-displacement texture includes grayscale color values reflecting magnitudes of surface normal offsets for a 3D-object mesh based on interpolations associated with one or more interpolation discontinuity lines of a 2D-sharpness map. Additionally, in some embodiments, the act 1106 includes generating a 3D object utilizing a filtered 2D-displacement texture and a 3D-object mesh to display the 3D object depicting surfaces based on grayscale color values reflecting magnitudes of surface normal offsets.

In addition to (or in alternative to) the acts above, in some embodiments, the sharp-displacement texture-rendering system 106 also performs a step for generating a 2D-sharpness map comprising one or more interpolation discontinuity lines for a 2D-displacement map. For instance, the acts and algorithms described above in relation to FIGS. 3, 4, and 7 (e.g., the acts 302-312, the acts 402-418, and the acts 702-712) comprise the corresponding acts and algorithms for performing a step for generating a 2D-sharpness map comprising one or more interpolation discontinuity lines for a 2D-displacement map.

Moreover, in addition to (or in alternative to) the acts above, in one or more embodiments, the sharp-displacement texture-rendering system 106 also performs a step for generating a filtered 2D-displacement texture that maintains discontinuities based on a 2D-sharpness map. For example, the acts and algorithms described above in relation to FIGS. 5 and 6 (e.g., the acts 502-508 and the acts 602-616) comprise the corresponding acts and algorithms for performing a step for generating a filtered 2D-displacement texture that maintains discontinuities based on a 2D-sharpness map.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium.

Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
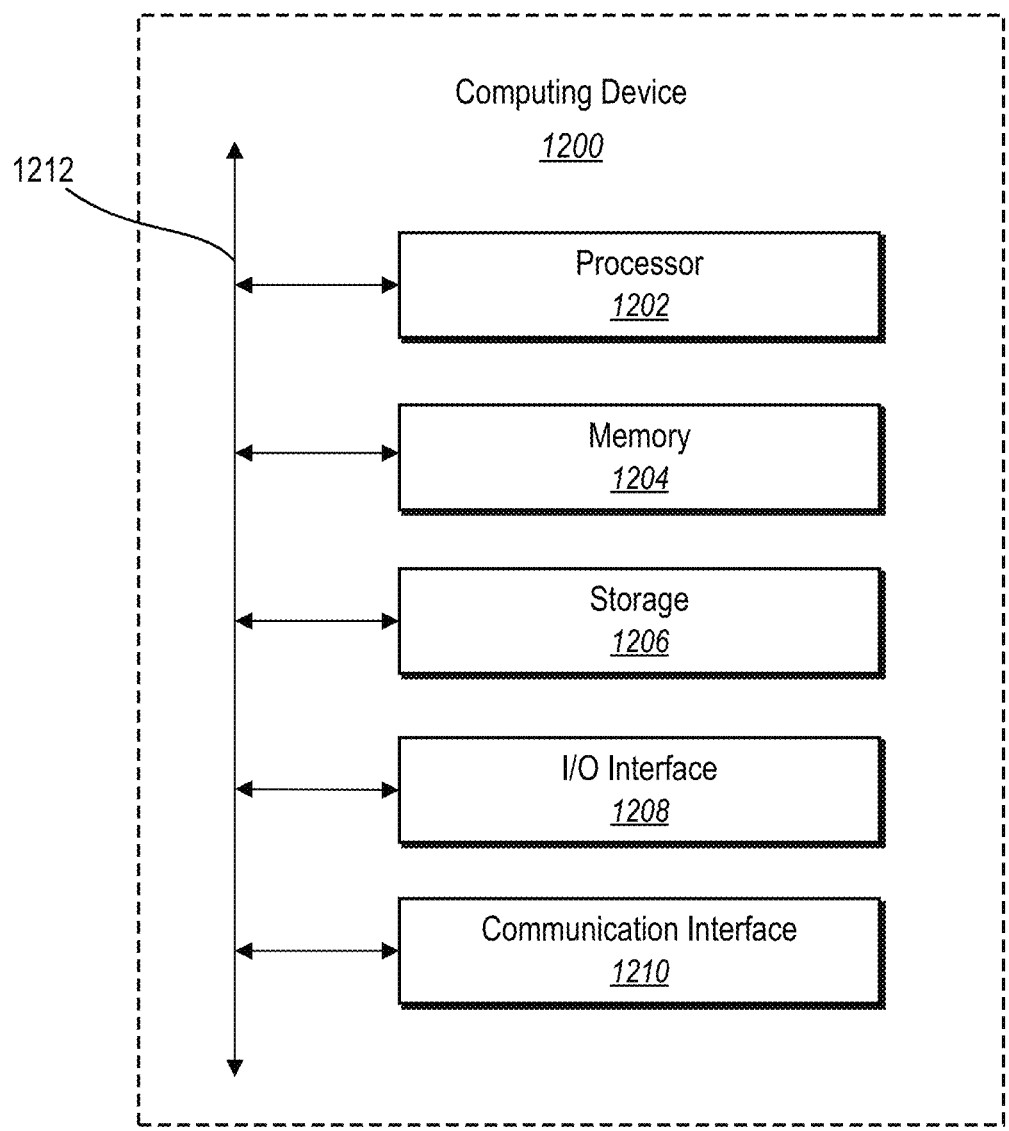
FIG. 12 illustrates a block diagram of an example computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the computing devices described above (e.g., computing device 1200, server device(s) 102, and client device 110). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive ("HDD"), flash memory, a Universal Serial Bus ("USB") drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller ("NIC") or network adapter for communicating with an Ethernet or other wire-based network or a wireless NIC ("WNIC") or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
  access a two-dimensional (2D)-displacement map, the 2D-displacement map comprising feature values corresponding to surface normal offsets for a three-dimensional (3D)-object mesh;
  access a 2D-sharpness map comprising at least one texel encoded with one or more discontinuity lines corresponding to the feature values of the 2D-displacement map;
  sample the 2D-displacement map based on the 2D-sharpness map to identify one or more feature values to filter by selecting, from the 2D-displacement map, the one or more feature values positioned on a same side of one or more discontinuity lines of the at least one texel of the 2D-sharpness map;

filter the one or more identified feature values to generate a filtered 2D-displacement texture; and generate, for display within a graphical user interface, a 3D object utilizing the filtered 2D-displacement texture and the 3D-object mesh.

2. The non-transitory computer-readable medium of claim 1, further comprising instructions that, when executed by the at least one processor, cause the computing device to sample the 2D-displacement map based on the 2D-sharpness map to identify the one or more feature values to filter by:

mapping the 2D-sharpness map in relation to the 2D-displacement map;

identifying a position of a texture sampling point within the 2D-displacement map; and selecting, from the 2D-displacement map, the one or more feature values positioned on the same side of the one or more discontinuity lines of the at least one texel of the 2D-sharpness map as the position of the texture sampling point.

3. The non-transitory computer-readable medium of claim 2, further comprising instructions that, when executed by the at least one processor, cause the computing device to:

sample the 2D-displacement map based on the 2D-sharpness map by:

identifying that the position of the texture sampling point and one or more interpolation evaluation corner points of the at least one texel are positioned within an area created by the one or more discontinuity lines and one or more edges of the at least one texel; and selecting the identified one or more feature values of the 2D-displacement map from the one or more interpolation evaluation corner points positioned within the area; and filter the one or more identified feature values within the area created by the one or more discontinuity lines and the one or more edges of the at least one texel of the 2D-sharpness map to generate the filtered 2D-displacement texture.

4. The non-transitory computer-readable medium of claim 2, wherein mapping the 2D-sharpness map in relation to the 2D-displacement map comprises shifting positional values of texels of the 2D-sharpness map to associate interpolation evaluation corner points of the texels with the feature values of the 2D-displacement map.

5. The non-transitory computer-readable medium of claim 1, wherein the 2D-sharpness map comprises the at least one texel encoded with one or more discontinuity points and a set of base discontinuity configurations having bit flags, the bit flags indicating whether to generate the one or more discontinuity lines between the one or more discontinuity points utilizing a given base discontinuity configuration from the set of base discontinuity configurations.

6. The non-transitory computer-readable medium of claim 1, further comprising instructions that, when executed by the at least one processor, cause the computing device to filter the one or more identified feature values utilizing bilinear interpolation.

7. The non-transitory computer-readable medium of claim 1, wherein the 2D-sharpness map comprises the at least one texel encoded with a discontinuity point on an edge of the at least one texel.

8. The non-transitory computer-readable medium of claim 1, further comprising instructions that, when executed by the at least one processor, cause the computing device to generate the 2D-sharpness map based on user selections of one or more discontinuity lines or by detecting one or more discontinuity lines in the 2D-displacement map utilizing a digital contour detector.

9. The non-transitory computer-readable medium of claim 1, further comprising instructions that, when executed by the at least one processor, cause the computing device to:

generate a reduced resolution 2D-displacement map by filtering the one or more identified feature values based on the 2D-sharpness map;

identify interpolation evaluation corner point positions within the reduced resolution 2D-displacement map at center points of one or more texels of the reduced resolution 2D-displacement map; and generate a reduced resolution 2D-sharpness map for the reduced resolution 2D-displacement map by:

identifying one or more partitions within the reduced resolution 2D-displacement map based on the one or more discontinuity lines of the 2D-sharpness map and the interpolation evaluation corner point positions in relation to the 2D-sharpness map; and generating one or more discontinuity lines for at least one texel of the reduced resolution 2D-sharpness map based on the identified one or more partitions and the interpolation evaluation corner point positions within the reduced resolution 2D-displacement map.

10. A system comprising:

one or more memory devices comprising:

a three-dimensional (3D)-object mesh; and a two-dimensional (2D)-displacement map comprising feature values corresponding to surface normal offsets for the 3D-object mesh; and one or more computing devices configured to cause the system to:

generate a 2D-sharpness map comprising at least one texel encoded with one or more discontinuity lines corresponding to one or more discontinuities of the 2D-displacement map;

sample the 2D-displacement map based on the 2D-sharpness map to identify one or more feature values to filter by:

mapping the 2D-sharpness map in relation to the 2D-displacement map;

identifying a position of a texture sampling point within the 2D-displacement map; and selecting, from the 2D-displacement map, one or more feature values positioned on a same side of the one or more discontinuity lines of the at least one texel of the 2D-sharpness map as the position of the texture sampling point; and filter the one or more identified feature values to generate a filtered 2D-displacement texture.

11. The system of claim 10, wherein the one or more computing devices are configured to:

sample the 2D-displacement map based on the 2D-sharpness map by:

identifying that the position of the texture sampling point and one or more interpolation evaluation corner points of the at least one texel are positioned within an area created by the one or more discontinuity lines and one or more edges of the at least one texel; and selecting the one or more identified feature values of the 2D-displacement map from the one or more interpolation evaluation corner points positioned within the area; and utilize bilinear interpolation to filter the one or more identified feature values within the area created by the one or more discontinuity lines and the one or more edges of the at least one texel of the 2D-sharpness map to generate the filtered 2D-displacement texture.

12. The system of claim 10, wherein the one or more computing devices are configured to generate the 2D-sharpness map comprising a first discontinuity point on a first edge of the at least one texel and a second discontinuity point on a second edge of the at least one texel.

13. The system of claim 12, wherein the one or more computing devices are configured to generate the 2D-sharpness map by encoding the at least one texel with at least one base discontinuity configuration indicating to generate a discontinuity line between the first discontinuity point and the second discontinuity point.

14. The system of claim 10, wherein the one or more computing devices are configured to generate the 2D-sharpness map by:

receiving a user selection of a discontinuity line in relation to a displayed 2D-displacement map;

identifying one or more discontinuity points and a base discontinuity configuration corresponding to the discontinuity line in relation to at least one texel of the 2D-sharpness map; and encoding the at least one texel with the one or more discontinuity points and the base discontinuity configuration.

15. The system of claim 10, wherein the one or more computing devices are configured to generate the 2D-sharpness map by:

utilizing a digital contour detector to detect a discontinuity line in the 2D-displacement map along differing feature values;

identifying one or more discontinuity points and a base discontinuity configuration corresponding to the discontinuity line in relation to at least one texel of the 2D-sharpness map; and encoding the at least one texel with the one or more discontinuity points and the base discontinuity configuration.

16. The system of claim 10, wherein the one or more computing devices are configured to generate, for display within a graphical user interface, a 3D object utilizing the filtered 2D-displacement texture and the 3D-object mesh, the 3D object depicting surfaces based on surface normal offsets corresponding to the filtered 2D-displacement texture.

17. A computer-implemented method comprising:

accessing a two-dimensional (2D)-displacement map, the 2D-displacement map comprising feature values corresponding to surface normal offsets for a three-dimensional (3D)-object mesh;

accessing a 2D-sharpness map comprising at least one texel encoded with one or more discontinuity lines corresponding to the feature values of the 2D-displacement map;

sampling the 2D-displacement map based on the 2D-sharpness map to identify one or more feature values to filter by selecting, from the 2D-displacement map, the one or more feature values positioned on a same side of one or more discontinuity lines of the at least one texel of the 2D-sharpness map;

filtering the one or more identified feature values to generate a filtered 2D-displacement texture; and generating, for display within a graphical user interface, a 3D object utilizing the filtered 2D-displacement texture and the 3D-object mesh.

18. The computer-implemented method of claim 17, wherein the 2D-sharpness map comprises the at least one texel encoded with one or more discontinuity points and a set of base discontinuity configurations having bit flags, the bit flags indicating whether to generate the one or more discontinuity lines between the one or more discontinuity points utilizing a given base discontinuity configuration from the set of base discontinuity configurations.

19. The computer-implemented method of claim 17 further comprising generating the 2D-sharpness map based on user selections of one or more discontinuity lines or by detecting one or more discontinuity lines in the 2D-displacement map utilizing a digital contour detector.

20. The computer-implemented method of claim 19, further comprising generating the 3D object utilizing the filtered 2D-displacement texture and the 3D-object mesh to display the 3D object depicting surfaces based on the surface normal offsets of filtered 2D-displacement texture.

* * * * *